US007536168B2

(12) United States Patent
Farkas et al.

(10) Patent No.: US 7,536,168 B2
(45) Date of Patent: May 19, 2009

(54) METHOD, EMITTER AND RECEIVER FOR TRANSMITTING DATA IN A MULTI-ACCESS CDMA SYSTEM BY FULLY COMPLEMENTARY CODE MATRIXES FOR TWO-DIMENSIONAL DATA SPREADING IN A FREQUENCY AND TIME DIRECTION

(75) Inventors: Peter Farkas, Bratislava (SK); Matús Turcsány, Svaty Jur (SK)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 10/554,536

(22) PCT Filed: Apr. 23, 2004

(86) PCT No.: PCT/EP2004/050593

§ 371 (c)(1), (2), (4) Date: Jun. 29, 2006

(87) PCT Pub. No.: WO2004/098106

PCT Pub. Date: Nov. 11, 2004

(65) Prior Publication Data

US 2007/0133474 A1 Jun. 14, 2007

(30) Foreign Application Priority Data

Apr. 25, 2003 (EP) ................................ 03009464

(51) Int. Cl.
*H04B 7/00* (2006.01)
*H04B 7/216* (2006.01)
*H04J 11/00* (2006.01)

(52) U.S. Cl. ....................... 455/403; 455/515; 370/203; 370/335; 370/342

(58) Field of Classification Search ................ 455/503, 455/515; 370/203, 335, 342
See application file for complete search history.

(56) References Cited

U.S. PATENT DOCUMENTS

2003/0108023 A1 * 6/2003 Lehmann et al. ............ 370/342

(Continued)

FOREIGN PATENT DOCUMENTS

EP 1 317 086 6/2003

(Continued)

OTHER PUBLICATIONS

H.H. Chen, J.F. Yen, N. Suehiro: "A Multicarrier CDMA Architecture Based on Orthogonal Complementary Codes for New Generations of Wideband Wireless Communications", IEEE Communications Magazine, vol. 39, Oct. 2001, pp. 126-135.

(Continued)

*Primary Examiner*—William D Cumming
(74) *Attorney, Agent, or Firm*—Staas & Halsey LLP

(57) ABSTRACT

A method transmits data bits between at least one subscriber station and a transmitter in a radio communication system. Each data bit is transmitted on at least two different units of a first radio resource. On the emitter side, the data bits are spread for each unit of the first radio resource in such a way that each data bit is multiplied by a code matrix of the same matrix code group for the first radio resource units whose lines display respectively a spreading code realigning to a second radio resource and the columns display respectively a spreading code relating to a third radio resource.

17 Claims, 26 Drawing Sheets

U.S. PATENT DOCUMENTS

| | | | | |
|---|---|---|---|---|
| 2004/0116139 | A1* | 6/2004 | Yi et al. | 455/503 |
| 2007/0133474 | A1* | 6/2007 | Farkas et al. | 370/335 |
| 2007/0258352 | A1* | 11/2007 | Wang et al. | 370/203 |
| 2008/0070611 | A1* | 3/2008 | Yi et al. | 455/515 |

FOREIGN PATENT DOCUMENTS

| | | |
|---|---|---|
| WO | 03/013038 | 2/2003 |

OTHER PUBLICATIONS

B.M. Popovic: “Spreading Sequences for Multicarrier CDMA Systems” IEEE Trans. On Communication, vol. 47, No. 6, Jun. 1999, pp. 918-926.

L. Xiao, Q. Liang: “A Novel MC-2D-CDMA Communication Systems and Its Dectection Methods”, Proc. IEEE ICC, 200, Jun. 2000.

R. Doostnejad, T.J. Lim, E.S. Sousa: Two Dimensional Spreading Codes fot the Downlink in a Multiuser System with Multiple Antennas, Proc. Of WPMC’2002, Honolulu Hawaii, pp. 743-747.

N. Suehiro, M. Hatori: N-Shift Cross-Orthogonal Sequences, IEEE Trans, Info. Theory, vol. IT-34, No. 1, Jan. 1988, pp. 143-146.

* cited by examiner

FIG 1

$$\left.\begin{array}{l} f_1^1=(+1, +1, +1, -1) \\ f_2^1=(+1, -1, +1, +1) \end{array}\right\} g1$$

$$\left.\begin{array}{l} f_1^2=(+1, +1, -1, +1) \\ f_2^2=(+1, -1, -1, -1) \end{array}\right\} g2$$

Figures 3, 4:
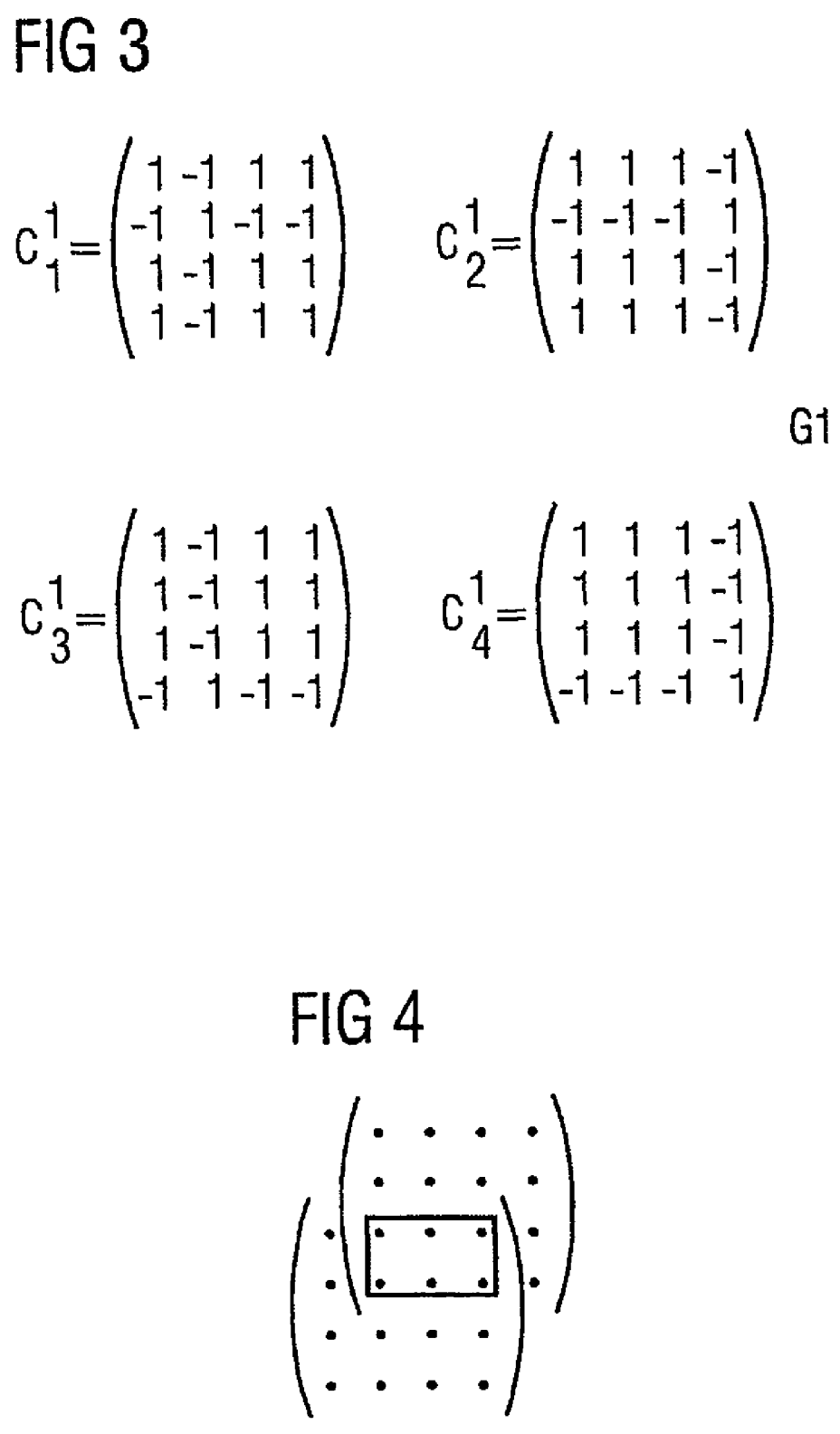

$$C_1^1=\begin{pmatrix}1&-1&1&1\\-1&1&-1&-1\\1&-1&1&1\\1&-1&1&1\end{pmatrix}\qquad C_2^1=\begin{pmatrix}1&1&1&-1\\-1&-1&-1&1\\1&1&1&-1\\1&1&1&-1\end{pmatrix}$$

G1

$$C_3^1=\begin{pmatrix}1&-1&1&1\\1&-1&1&1\\1&-1&1&1\\-1&1&-1&-1\end{pmatrix}\qquad C_4^1=\begin{pmatrix}1&1&1&-1\\1&1&1&-1\\1&1&1&-1\\-1&-1&-1&1\end{pmatrix}$$

| | | | | | | | | | | | | | | | | |
|---|---|---|---|---|---|---|---|---|---|---|---|---|---|---|---|---|
| $f_1^1$= | 1 | -1 | 1 | -1 | -1 | -1 | 1 | 1 | -1 | 1 | 1 | -1 | -1 | -1 | -1 | -1 |
| $f_2^1$= | 1 | 1 | -1 | -1 | -1 | 1 | -1 | 1 | -1 | -1 | -1 | -1 | -1 | 1 | 1 | -1 |
| $f_3^1$= | -1 | -1 | -1 | -1 | 1 | -1 | -1 | 1 | 1 | 1 | -1 | -1 | 1 | -1 | 1 | -1 |
| $f_4^1$= | -1 | 1 | 1 | -1 | 1 | 1 | 1 | 1 | 1 | -1 | 1 | -1 | 1 | 1 | -1 | -1 | g1

| | | | | | | | | | | | | | | | | |
|---|---|---|---|---|---|---|---|---|---|---|---|---|---|---|---|---|
| $f_1^2$= | 1 | -1 | 1 | -1 | 1 | 1 | -1 | -1 | 1 | -1 | -1 | 1 | -1 | -1 | -1 | -1 |
| $f_2^2$= | 1 | 1 | -1 | -1 | 1 | -1 | 1 | -1 | 1 | 1 | 1 | 1 | -1 | 1 | 1 | -1 |
| $f_3^2$= | -1 | -1 | -1 | -1 | -1 | 1 | 1 | -1 | -1 | -1 | 1 | 1 | 1 | -1 | 1 | -1 |
| $f_4^2$= | -1 | 1 | 1 | -1 | -1 | -1 | -1 | -1 | -1 | 1 | -1 | 1 | 1 | 1 | -1 | -1 | g2

| | | | | | | | | | | | | | | | | |
|---|---|---|---|---|---|---|---|---|---|---|---|---|---|---|---|---|
| $f_1^3$= | 1 | -1 | 1 | -1 | 1 | 1 | -1 | -1 | -1 | 1 | 1 | -1 | 1 | 1 | 1 | 1 |
| $f_2^3$= | 1 | 1 | -1 | -1 | 1 | -1 | 1 | -1 | -1 | -1 | -1 | -1 | 1 | -1 | -1 | 1 |
| $f_3^3$= | -1 | -1 | -1 | -1 | -1 | 1 | 1 | -1 | 1 | 1 | -1 | -1 | -1 | 1 | -1 | 1 |
| $f_4^3$= | -1 | 1 | 1 | -1 | -1 | -1 | -1 | -1 | 1 | -1 | 1 | -1 | -1 | -1 | 1 | 1 | g3

| | | | | | | | | | | | | | | | | |
|---|---|---|---|---|---|---|---|---|---|---|---|---|---|---|---|---|
| $f_1^4$= | 1 | -1 | 1 | -1 | -1 | -1 | 1 | 1 | 1 | -1 | -1 | 1 | 1 | 1 | 1 | 1 |
| $f_2^4$= | 1 | 1 | -1 | -1 | -1 | 1 | -1 | 1 | 1 | 1 | 1 | 1 | 1 | -1 | -1 | 1 |
| $f_3^4$= | -1 | -1 | -1 | -1 | 1 | -1 | -1 | 1 | -1 | -1 | 1 | 1 | -1 | 1 | -1 | 1 |
| $f_4^4$= | -1 | 1 | 1 | -1 | 1 | 1 | 1 | 1 | -1 | 1 | -1 | 1 | -1 | -1 | 1 | 1 | g4

| | | | | | |
|---|---|---|---|---|---|
| $f_1^1=$ | (1,0) | (-1,0) | (0,-1) | (0,-1) | g1 |
| $f_2^1=$ | (-1,0) | (-1,0) | (0,1) | (0,-1) | |

| | | | | | |
|---|---|---|---|---|---|
| $f_1^2=$ | (-1,0) | (1,0) | (0,-1) | (0,-1) | g2 |
| $f_2^2=$ | (1,0) | (1,0) | (0,1) | (0,-1) | |

| | | | |
|---|---|---|---|
| (1,0) | (1,0) | (0,-1) | (0,1) |
| (1,0) | (1,0) | (0,-1) | (0,1) |
| (0,-1) | (0,-1) | (-1,0) | (1,0) |
| (0,1) | (0,1) | (1,0) | (-1,0) |

$c_2^1=$

| | | | |
|---|---|---|---|
| (-1,0) | (1,0) | (0,1) | (0,1) |
| (-1,0) | (1,0) | (0,1) | (0,1) |
| (0,1) | (0,-1) | (1,0) | (1,0) |
| (0,-1) | (0,1) | (-1,0) | (-1,0) |

$c_3^1=$

| | | | |
|---|---|---|---|
| (-1,0) | (-1,0) | (0,1) | (0,-1) |
| (1,0) | (1,0) | (0,-1) | (0,1) |
| (0,1) | (0,1) | (1,0) | (-1,0) |
| (0,1) | (0,1) | (1,0) | (-1,0) |

$c_4^1=$

| | | | |
|---|---|---|---|
| (1,0) | (-1,0) | (0,-1) | (0,-1) |
| (-1,0) | (1,0) | (0,1) | (0,1) |
| (0,-1) | (0,1) | (-1,0) | (-1,0) |
| (0,-1) | (0,1) | (-1,0) | (-1,0) |

G2

$c_1^2=$

| | | | |
|---|---|---|---|
| (1,0) | (1,0) | (0,1) | (0,-1) |
| (1,0) | (1,0) | (0,1) | (0,-1) |
| (0,1) | (0,1) | (-1,0) | (1,0) |
| (0,-1) | (0,-1) | (1,0) | (-1,0) |

$c_2^2=$

| | | | |
|---|---|---|---|
| (-1,0) | (1,0) | (0,-1) | (0,-1) |
| (-1,0) | (1,0) | (0,-1) | (0,-1) |
| (0,-1) | (0,1) | (1,0) | (1,0) |
| (0,1) | (0,-1) | (-1,0) | (-1,0) |

$c_3^2=$

| | | | |
|---|---|---|---|
| (-1,0) | (-1,0) | (0,-1) | (0,1) |
| (1,0) | (1,0) | (0,1) | (0,-1) |
| (0,-1) | (0,-1) | (1,0) | (-1,0) |
| (0,-1) | (0,-1) | (1,0) | (-1,0) |

$c_4^2=$

| | | | |
|---|---|---|---|
| (1,0) | (-1,0) | (0,1) | (0,1) |
| (-1,0) | (1,0) | (0,-1) | (0,-1) |
| (0,1) | (0,-1) | (-1,0) | (-1,0) |
| (0,1) | (0,-1) | (-1,0) | (-1,0) |

FIG 9

$$c_1^1=\begin{bmatrix} 1 & 1 & e^{j\frac{3\pi}{2}} & e^{j\frac{\pi}{2}} \\ 1 & 1 & e^{j\frac{3\pi}{2}} & e^{j\frac{\pi}{2}} \\ e^{j\frac{3\pi}{2}} & e^{j\frac{3\pi}{2}} & -1 & 1 \\ e^{j\frac{\pi}{2}} & e^{j\frac{\pi}{2}} & 1 & -1 \end{bmatrix}$$

| 1 | -1 | 1 | -1 | -1 | -1 | 1 | 1 | -1 | 1 | 1 | -1 | -1 | -1 | -1 | -1 |
|---|---|---|---|---|---|---|---|---|---|---|---|---|---|---|---|
| -1 | 1 | -1 | 1 | 1 | 1 | -1 | -1 | 1 | -1 | -1 | 1 | 1 | 1 | 1 | 1 |
| -1 | 1 | -1 | 1 | 1 | 1 | -1 | -1 | 1 | -1 | -1 | 1 | 1 | 1 | 1 | 1 |
| -1 | 1 | -1 | 1 | 1 | 1 | -1 | -1 | 1 | -1 | -1 | 1 | 1 | 1 | 1 | 1 |

$C_2^1 =$

| 1 | 1 | -1 | -1 | -1 | 1 | -1 | 1 | -1 | -1 | -1 | -1 | -1 | 1 | 1 | -1 |
|---|---|---|---|---|---|---|---|---|---|---|---|---|---|---|---|
| -1 | -1 | 1 | 1 | 1 | -1 | 1 | -1 | 1 | 1 | 1 | 1 | 1 | -1 | -1 | 1 |
| -1 | -1 | 1 | 1 | 1 | -1 | 1 | -1 | 1 | 1 | 1 | 1 | 1 | -1 | -1 | 1 |
| -1 | -1 | 1 | 1 | 1 | -1 | 1 | -1 | 1 | 1 | 1 | 1 | 1 | -1 | -1 | 1 |

$C_3^1 =$

| -1 | -1 | -1 | -1 | 1 | -1 | -1 | 1 | 1 | 1 | -1 | -1 | 1 | -1 | 1 | -1 |
|---|---|---|---|---|---|---|---|---|---|---|---|---|---|---|---|
| 1 | 1 | 1 | 1 | -1 | 1 | 1 | -1 | -1 | -1 | 1 | 1 | -1 | 1 | -1 | 1 |
| 1 | 1 | 1 | 1 | -1 | 1 | 1 | -1 | -1 | -1 | 1 | 1 | -1 | 1 | -1 | 1 |
| 1 | 1 | 1 | 1 | -1 | 1 | 1 | -1 | -1 | -1 | 1 | 1 | -1 | 1 | -1 | 1 |

$C_4^1 =$

| -1 | 1 | 1 | -1 | 1 | 1 | 1 | 1 | 1 | -1 | 1 | -1 | 1 | 1 | -1 | -1 |
|---|---|---|---|---|---|---|---|---|---|---|---|---|---|---|---|
| 1 | -1 | -1 | 1 | -1 | -1 | -1 | -1 | -1 | 1 | -1 | 1 | -1 | -1 | 1 | 1 |
| 1 | -1 | -1 | 1 | -1 | -1 | -1 | -1 | -1 | 1 | -1 | 1 | -1 | -1 | 1 | 1 |
| 1 | -1 | -1 | 1 | -1 | -1 | -1 | -1 | -1 | 1 | -1 | 1 | -1 | -1 | 1 | 1 |

G1

$C_5^1 =$

| 1 | -1 | 1 | -1 | -1 | -1 | 1 | 1 | -1 | 1 | 1 | -1 | -1 | -1 | -1 | -1 |
|---|---|---|---|---|---|---|---|---|---|---|---|---|---|---|---|
| 1 | -1 | 1 | -1 | -1 | -1 | 1 | 1 | -1 | 1 | 1 | -1 | -1 | -1 | -1 | -1 |
| -1 | 1 | -1 | 1 | 1 | 1 | -1 | -1 | 1 | -1 | -1 | 1 | 1 | 1 | 1 | 1 |
| 1 | -1 | 1 | -1 | -1 | -1 | 1 | 1 | -1 | 1 | 1 | -1 | -1 | -1 | -1 | -1 |

$C_6^1 =$

| 1 | 1 | -1 | -1 | -1 | 1 | -1 | 1 | -1 | -1 | -1 | -1 | -1 | 1 | 1 | -1 |
|---|---|---|---|---|---|---|---|---|---|---|---|---|---|---|---|
| 1 | 1 | -1 | -1 | -1 | 1 | -1 | 1 | -1 | -1 | -1 | -1 | -1 | 1 | 1 | -1 |
| -1 | -1 | 1 | 1 | 1 | -1 | 1 | -1 | 1 | 1 | 1 | 1 | 1 | -1 | -1 | 1 |
| 1 | 1 | -1 | -1 | -1 | 1 | -1 | 1 | -1 | -1 | -1 | -1 | -1 | 1 | 1 | -1 |

$C_7^1 =$

| -1 | -1 | -1 | -1 | 1 | -1 | -1 | 1 | 1 | 1 | -1 | -1 | 1 | -1 | 1 | -1 |
|---|---|---|---|---|---|---|---|---|---|---|---|---|---|---|---|
| -1 | -1 | -1 | -1 | 1 | -1 | -1 | 1 | 1 | 1 | -1 | -1 | 1 | -1 | 1 | -1 |
| 1 | 1 | 1 | 1 | -1 | 1 | 1 | -1 | -1 | -1 | 1 | 1 | -1 | 1 | -1 | 1 |
| -1 | -1 | -1 | -1 | 1 | -1 | -1 | 1 | 1 | 1 | -1 | -1 | 1 | -1 | 1 | -1 |

$C_8^1 =$

| -1 | 1 | 1 | -1 | 1 | 1 | 1 | 1 | 1 | -1 | 1 | -1 | 1 | 1 | -1 | -1 |
|---|---|---|---|---|---|---|---|---|---|---|---|---|---|---|---|
| -1 | 1 | 1 | -1 | 1 | 1 | 1 | 1 | 1 | -1 | 1 | -1 | 1 | 1 | -1 | -1 |
| 1 | -1 | -1 | 1 | -1 | -1 | -1 | -1 | -1 | 1 | -1 | 1 | -1 | -1 | 1 | 1 |
| -1 | 1 | 1 | -1 | 1 | 1 | 1 | 1 | 1 | -1 | 1 | -1 | 1 | 1 | -1 | -1 |

FIG 11A

| | | | | | | | | | | | | | | | | |
|---|---|---|---|---|---|---|---|---|---|---|---|---|---|---|---|---|
| $f_1^1=$ | (-1,0) | (1,0) | (-1,0) | (1,0) | (0,-1) | (-1,0) | (0,1) | (1,0) | (1,0) | (1,0) | (1,0) | (1,0) | (0,-1) | (1,0) | (0,1) | (-1,0) |
| $f_2^1=$ | (1,0) | (0,1) | (-1,0) | (0,-1) | (0,1) | (0,-1) | (0,1) | (0,-1) | (-1,0) | (0,1) | (1,0) | (0,-1) | (0,1) | (0,1) | (0,1) | (0,1) |
| $f_3^1=$ | (1,0) | (1,0) | (1,0) | (1,0) | (0,1) | (-1,0) | (0,-1) | (1,0) | (-1,0) | (1,0) | (-1,0) | (1,0) | (0,1) | (1,0) | (0,-1) | (-1,0) |
| $f_4^1=$ | (1,0) | (0,-1) | (-1,0) | (0,1) | (0,1) | (0,1) | (0,1) | (0,1) | (-1,0) | (0,-1) | (1,0) | (0,1) | (0,1) | (0,-1) | (0,1) | (0,-1) | g1

| | | | | | | | | | | | | | | | | |
|---|---|---|---|---|---|---|---|---|---|---|---|---|---|---|---|---|
| $f_1^2=$ | (1,0) | (-1,0) | (1,0) | (-1,0) | (0,-1) | (-1,0) | (0,1) | (1,0) | (-1,0) | (-1,0) | (-1,0) | (-1,0) | (0,-1) | (1,0) | (0,1) | (-1,0) |
| $f_2^2=$ | (-1,0) | (0,-1) | (1,0) | (0,1) | (0,1) | (0,-1) | (0,1) | (0,-1) | (1,0) | (0,-1) | (-1,0) | (0,1) | (0,1) | (0,1) | (0,1) | (0,1) |
| $f_3^2=$ | (-1,0) | (-1,0) | (-1,0) | (-1,0) | (0,1) | (-1,0) | (0,-1) | (1,0) | (1,0) | (-1,0) | (1,0) | (-1,0) | (0,1) | (1,0) | (0,-1) | (-1,0) |
| $f_4^2=$ | (-1,0) | (0,1) | (1,0) | (0,-1) | (0,1) | (0,1) | (0,1) | (0,1) | (1,0) | (0,1) | (-1,0) | (0,-1) | (0,1) | (0,-1) | (0,1) | (0,-1) | g2

FIG 11B g3

| | | | | | | | | | | | | | | | | |
|---|---|---|---|---|---|---|---|---|---|---|---|---|---|---|---|---|
| $f_1^3=$ | (1,0) | (-1,0) | (1,0) | (-1,0) | (-1,0) | (0,1) | (1,0) | (0,-1) | (1,0) | (1,0) | (1,0) | (1,0) | (1,0) | (0,1) | (-1,0) | (0,-1) |
| $f_2^3=$ | (-1,0) | (0,-1) | (1,0) | (0,1) | (1,0) | (-1,0) | (1,0) | (-1,0) | (-1,0) | (0,1) | (1,0) | (0,-1) | (-1,0) | (-1,0) | (-1,0) | (-1,0) |
| $f_3^3=$ | (-1,0) | (-1,0) | (-1,0) | (-1,0) | (1,0) | (0,1) | (-1,0) | (0,-1) | (-1,0) | (1,0) | (-1,0) | (1,0) | (-1,0) | (0,1) | (1,0) | (0,-1) |
| $f_4^3=$ | (-1,0) | (0,1) | (1,0) | (0,-1) | (1,0) | (1,0) | (1,0) | (1,0) | (-1,0) | (0,-1) | (1,0) | (0,1) | (-1,0) | (1,0) | (-1,0) | (1,0) | g4

| | | | | | | | | | | | | | | | | |
|---|---|---|---|---|---|---|---|---|---|---|---|---|---|---|---|---|
| $f_1^4=$ | (1,0) | (-1,0) | (1,0) | (-1,0) | (1,0) | (0,-1) | (-1,0) | (0,1) | (1,0) | (1,0) | (1,0) | (1,0) | (-1,0) | (0,-1) | (1,0) | (0,1) |
| $f_2^4=$ | (-1,0) | (0,-1) | (1,0) | (0,1) | (-1,0) | (1,0) | (-1,0) | (1,0) | (-1,0) | (0,1) | (1,0) | (0,-1) | (1,0) | (1,0) | (1,0) | (1,0) |
| $f_3^4=$ | (-1,0) | (-1,0) | (-1,0) | (-1,0) | (-1,0) | (0,-1) | (1,0) | (0,1) | (-1,0) | (1,0) | (-1,0) | (1,0) | (1,0) | (0,-1) | (-1,0) | (0,1) |
| $f_4^4=$ | (-1,0) | (0,1) | (1,0) | (0,-1) | (-1,0) | (-1,0) | (-1,0) | (-1,0) | (-1,0) | (0,-1) | (1,0) | (0,1) | (1,0) | (-1,0) | (1,0) | (-1,0) |

FIG 12A $C_1^1 =$

| | | | | | | | | | | | | | | | |
|---|---|---|---|---|---|---|---|---|---|---|---|---|---|---|---|
| (1,0) | (-1,0) | (1,0) | (-1,0) | (0,1) | (1,0) | (0,-1) | (-1,0) | (-1,0) | (-1,0) | (-1,0) | (-1,0) | (0,1) | (-1,0) | (0,-1) | (1,0) |
| (-1,0) | (1,0) | (-1,0) | (1,0) | (0,-1) | (-1,0) | (0,1) | (1,0) | (1,0) | (1,0) | (1,0) | (1,0) | (0,-1) | (1,0) | (0,1) | (-1,0) |
| (0,1) | (0,-1) | (0,1) | (0,-1) | (-1,0) | (0,1) | (1,0) | (0,-1) | (0,-1) | (0,-1) | (0,-1) | (0,-1) | (-1,0) | (0,-1) | (1,0) | (0,1) |
| (0,1) | (0,-1) | (0,1) | (0,-1) | (-1,0) | (0,1) | (1,0) | (0,-1) | (0,-1) | (0,-1) | (0,-1) | (0,-1) | (-1,0) | (0,-1) | (1,0) | (0,1) |

$C_2^1 =$

| | | | | | | | | | | | | | | | |
|---|---|---|---|---|---|---|---|---|---|---|---|---|---|---|---|
| (-1,0) | (0,-1) | (1,0) | (0,1) | (0,-1) | (0,1) | (0,-1) | (0,1) | (1,0) | (0,-1) | (-1,0) | (0,1) | (0,-1) | (0,-1) | (0,-1) | (0,-1) |
| (1,0) | (0,1) | (-1,0) | (0,-1) | (0,1) | (0,-1) | (0,1) | (0,-1) | (-1,0) | (0,1) | (1,0) | (0,-1) | (0,1) | (0,1) | (0,1) | (0,1) |
| (0,-1) | (1,0) | (0,1) | (-1,0) | (1,0) | (-1,0) | (1,0) | (-1,0) | (0,1) | (1,0) | (0,-1) | (-1,0) | (1,0) | (1,0) | (1,0) | (1,0) |
| (0,-1) | (1,0) | (0,1) | (-1,0) | (1,0) | (-1,0) | (1,0) | (-1,0) | (0,1) | (1,0) | (0,-1) | (-1,0) | (1,0) | (1,0) | (1,0) | (1,0) |

$C_3^1 =$

| | | | | | | | | | | | | | | | |
|---|---|---|---|---|---|---|---|---|---|---|---|---|---|---|---|
| (-1,0) | (-1,0) | (-1,0) | (-1,0) | (0,-1) | (1,0) | (0,1) | (-1,0) | (1,0) | (-1,0) | (1,0) | (-1,0) | (0,-1) | (-1,0) | (0,1) | (1,0) |
| (1,0) | (1,0) | (1,0) | (1,0) | (0,1) | (-1,0) | (0,-1) | (1,0) | (-1,0) | (1,0) | (-1,0) | (1,0) | (0,1) | (1,0) | (0,-1) | (-1,0) |
| (0,-1) | (0,-1) | (0,-1) | (0,-1) | (1,0) | (0,1) | (-1,0) | (0,-1) | (0,1) | (0,-1) | (0,1) | (0,-1) | (1,0) | (0,-1) | (-1,0) | (0,1) |
| (0,-1) | (0,-1) | (0,-1) | (0,-1) | (1,0) | (0,1) | (-1,0) | (0,-1) | (0,1) | (0,-1) | (0,1) | (0,-1) | (1,0) | (0,-1) | (-1,0) | (0,1) |

$C_4^1 =$

| | | | | | | | | | | | | | | | |
|---|---|---|---|---|---|---|---|---|---|---|---|---|---|---|---|
| (-1,0) | (0,1) | (1,0) | (0,-1) | (0,-1) | (0,-1) | (0,-1) | (0,-1) | (1,0) | (0,1) | (-1,0) | (0,-1) | (0,-1) | (0,1) | (0,-1) | (0,1) |
| (1,0) | (0,-1) | (-1,0) | (0,1) | (0,1) | (0,1) | (0,1) | (0,1) | (-1,0) | (0,-1) | (1,0) | (0,1) | (0,1) | (0,-1) | (0,1) | (0,-1) |
| (0,-1) | (-1,0) | (0,1) | (1,0) | (1,0) | (1,0) | (1,0) | (1,0) | (0,1) | (-1,0) | (0,-1) | (1,0) | (1,0) | (-1,0) | (1,0) | (-1,0) |
| (0,-1) | (-1,0) | (0,1) | (1,0) | (1,0) | (1,0) | (1,0) | (1,0) | (0,1) | (-1,0) | (0,-1) | (1,0) | (1,0) | (-1,0) | (1,0) | (-1,0) |

$C_5^1 =$

| | | | | | | | | | | | | | | | |
|---|---|---|---|---|---|---|---|---|---|---|---|---|---|---|---|
| (-1,0) | (1,0) | (-1,0) | (1,0) | (0,-1) | (-1,0) | (0,1) | (1,0) | (1,0) | (1,0) | (1,0) | (1,0) | (0,-1) | (1,0) | (0,1) | (-1,0) |
| (-1,0) | (1,0) | (-1,0) | (1,0) | (0,-1) | (-1,0) | (0,1) | (1,0) | (1,0) | (1,0) | (1,0) | (1,0) | (0,-1) | (1,0) | (0,1) | (-1,0) |
| (0,-1) | (0,1) | (0,-1) | (0,1) | (1,0) | (0,-1) | (-1,0) | (0,1) | (0,1) | (0,1) | (0,1) | (0,1) | (1,0) | (0,1) | (-1,0) | (0,-1) |
| (0,1) | (0,-1) | (0,1) | (0,-1) | (-1,0) | (0,1) | (1,0) | (0,-1) | (0,-1) | (0,-1) | (0,-1) | (0,-1) | (-1,0) | (0,-1) | (1,0) | (0,1) |

$C_6^1 =$

| | | | | | | | | | | | | | | | |
|---|---|---|---|---|---|---|---|---|---|---|---|---|---|---|---|
| (1,0) | (0,1) | (-1,0) | (0,-1) | (0,1) | (0,-1) | (0,1) | (0,-1) | (-1,0) | (0,1) | (1,0) | (0,-1) | (0,1) | (0,1) | (0,1) | (0,1) |
| (1,0) | (0,1) | (-1,0) | (0,-1) | (0,1) | (0,-1) | (0,1) | (0,-1) | (-1,0) | (0,1) | (1,0) | (0,-1) | (0,1) | (0,1) | (0,1) | (0,1) |
| (0,1) | (-1,0) | (0,-1) | (1,0) | (-1,0) | (1,0) | (-1,0) | (1,0) | (0,-1) | (-1,0) | (0,1) | (1,0) | (-1,0) | (-1,0) | (-1,0) | (-1,0) |
| (0,-1) | (1,0) | (0,1) | (-1,0) | (1,0) | (-1,0) | (1,0) | (-1,0) | (0,1) | (1,0) | (0,-1) | (-1,0) | (1,0) | (1,0) | (1,0) | (1,0) |

FIG 12B $C_7^1 =$

| | | | | | | | | | | | | | | | |
|---|---|---|---|---|---|---|---|---|---|---|---|---|---|---|---|
| (1,0) | (1,0) | (1,0) | (1,0) | (0,1) | (-1,0) | (0,-1) | (1,0) | (-1,0) | (1,0) | (-1,0) | (1,0) | (0,1) | (1,0) | (0,-1) | (-1,0) |
| (1,0) | (1,0) | (1,0) | (1,0) | (0,1) | (-1,0) | (0,-1) | (1,0) | (-1,0) | (1,0) | (-1,0) | (1,0) | (0,1) | (1,0) | (0,-1) | (-1,0) |
| (0,1) | (0,1) | (0,1) | (0,1) | (-1,0) | (0,-1) | (1,0) | (0,1) | (0,-1) | (0,1) | (0,-1) | (0,1) | (-1,0) | (0,1) | (1,0) | (0,-1) |
| (0,-1) | (0,-1) | (0,-1) | (0,-1) | (1,0) | (0,1) | (-1,0) | (0,-1) | (0,1) | (0,-1) | (0,1) | (0,-1) | (1,0) | (0,-1) | (-1,0) | (0,1) |

$C_8^1 =$

| | | | | | | | | | | | | | | | |
|---|---|---|---|---|---|---|---|---|---|---|---|---|---|---|---|
| (1,0) | (0,-1) | (-1,0) | (0,1) | (0,1) | (0,1) | (0,1) | (0,1) | (-1,0) | (0,-1) | (1,0) | (0,1) | (0,1) | (0,-1) | (0,1) | (0,-1) |
| (1,0) | (0,-1) | (-1,0) | (0,1) | (0,1) | (0,1) | (0,1) | (0,1) | (-1,0) | (0,-1) | (1,0) | (0,1) | (0,1) | (0,-1) | (0,1) | (0,-1) |
| (0,1) | (1,0) | (0,-1) | (-1,0) | (-1,0) | (-1,0) | (-1,0) | (-1,0) | (0,-1) | (1,0) | (0,1) | (-1,0) | (-1,0) | (1,0) | (-1,0) | (1,0) |
| (0,-1) | (-1,0) | (0,1) | (1,0) | (1,0) | (1,0) | (1,0) | (1,0) | (0,1) | (-1,0) | (0,-1) | (1,0) | (1,0) | (-1,0) | (1,0) | (-1,0) |

Figure 13B:
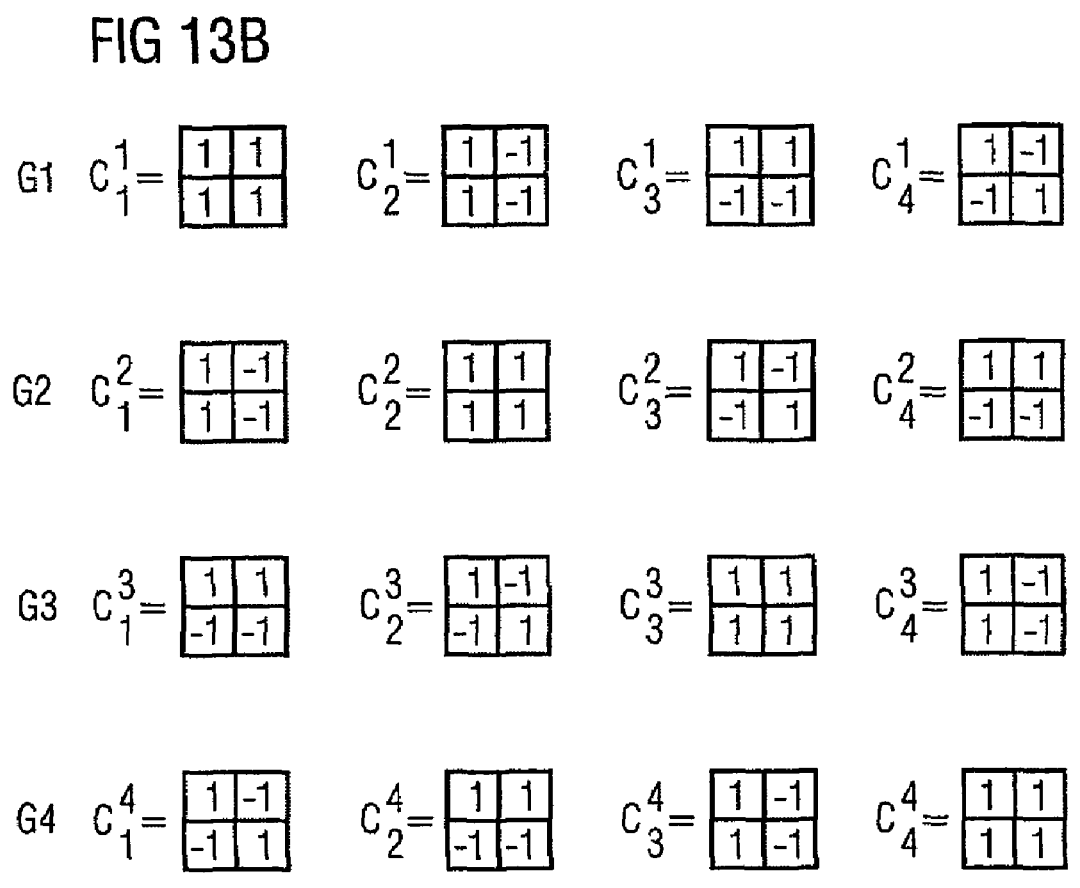

G1 $C^1_1 = \begin{bmatrix} 1 & 1 \\ 1 & 1 \end{bmatrix}$ $C^1_2 = \begin{bmatrix} 1 & -1 \\ 1 & -1 \end{bmatrix}$ $C^1_3 = \begin{bmatrix} 1 & 1 \\ -1 & -1 \end{bmatrix}$ $C^1_4 = \begin{bmatrix} 1 & -1 \\ -1 & 1 \end{bmatrix}$ G2 $C^2_1 = \begin{bmatrix} 1 & -1 \\ 1 & -1 \end{bmatrix}$ $C^2_2 = \begin{bmatrix} 1 & 1 \\ 1 & 1 \end{bmatrix}$ $C^2_3 = \begin{bmatrix} 1 & -1 \\ -1 & 1 \end{bmatrix}$ $C^2_4 = \begin{bmatrix} 1 & 1 \\ -1 & -1 \end{bmatrix}$ G3 $C^3_1 = \begin{bmatrix} 1 & 1 \\ -1 & -1 \end{bmatrix}$ $C^3_2 = \begin{bmatrix} 1 & -1 \\ -1 & 1 \end{bmatrix}$ $C^3_3 = \begin{bmatrix} 1 & 1 \\ 1 & 1 \end{bmatrix}$ $C^3_4 = \begin{bmatrix} 1 & -1 \\ 1 & -1 \end{bmatrix}$ G4 $C^4_1 = \begin{bmatrix} 1 & -1 \\ -1 & 1 \end{bmatrix}$ $C^4_2 = \begin{bmatrix} 1 & 1 \\ -1 & -1 \end{bmatrix}$ $C^4_3 = \begin{bmatrix} 1 & -1 \\ 1 & -1 \end{bmatrix}$ $C^4_4 = \begin{bmatrix} 1 & 1 \\ 1 & 1 \end{bmatrix}$

| (1,0) | (1,0) | (0,-1) | (0,1) |
|---|---|---|---|
| (1,0) | (1,0) | (0,-1) | (0,1) |
| (0,-1) | (0,-1) | (-1,0) | (1,0) |
| (0,1) | (0,1) | (1,0) | (-1,0) |

$C_2^1=$

| (-1,0) | (1,0) | (0,1) | (0,1) |
|---|---|---|---|
| (-1,0) | (1,0) | (0,1) | (0,1) |
| (0,1) | (0,-1) | (1,0) | (1,0) |
| (0,-1) | (0,1) | (-1,0) | (-1,0) |

$C_3^1=$

| (-1,0) | (-1,0) | (0,1) | (0,-1) |
|---|---|---|---|
| (1,0) | (1,0) | (0,-1) | (0,1) |
| (0,1) | (0,1) | (1,0) | (-1,0) |
| (0,1) | (0,1) | (1,0) | (-1,0) |

$C_4^1=$

| (1,0) | (-1,0) | (0,-1) | (0,-1) |
|---|---|---|---|
| (-1,0) | (1,0) | (0,1) | (0,1) |
| (0,-1) | (0,1) | (-1,0) | (-1,0) |
| (0,-1) | (0,1) | (-1,0) | (-1,0) |

G2 $C_1^2=$

| (-1,0) | (-1,0) | (0,-1) | (0,1) |
|---|---|---|---|
| (-1,0) | (-1,0) | (0,-1) | (0,1) |
| (0,1) | (0,1) | (-1,0) | (1,0) |
| (0,-1) | (0,-1) | (1,0) | (-1,0) |

$C_2^2=$

| (1,0) | (-1,0) | (0,1) | (0,1) |
|---|---|---|---|
| (1,0) | (-1,0) | (0,1) | (0,1) |
| (0,-1) | (0,1) | (1,0) | (1,0) |
| (0,1) | (0,-1) | (-1,0) | (-1,0) |

$C_3^2=$

| (1,0) | (1,0) | (0,1) | (0,-1) |
|---|---|---|---|
| (-1,0) | (-1,0) | (0,-1) | (0,1) |
| (0,-1) | (0,-1) | (1,0) | (-1,0) |
| (0,-1) | (0,-1) | (1,0) | (-1,0) |

$C_4^2=$

| (-1,0) | (1,0) | (0,-1) | (0,-1) |
|---|---|---|---|
| (1,0) | (-1,0) | (0,1) | (0,1) |
| (0,1) | (0,-1) | (-1,0) | (-1,0) |
| (0,1) | (0,-1) | (-1,0) | (-1,0) |

G3 $C_1^3=$

| (-1,0) | (-1,0) | (0,1) | (0,-1) |
|---|---|---|---|
| (-1,0) | (-1,0) | (0,1) | (0,-1) |
| (0,-1) | (0,-1) | (-1,0) | (1,0) |
| (0,1) | (0,1) | (1,0) | (-1,0) |

$C_2^3=$

| (1,0) | (-1,0) | (0,-1) | (0,-1) |
|---|---|---|---|
| (1,0) | (-1,0) | (0,-1) | (0,-1) |
| (0,1) | (0,-1) | (1,0) | (1,0) |
| (0,-1) | (0,1) | (-1,0) | (-1,0) |

$C_3^3=$

| (1,0) | (1,0) | (0,-1) | (0,1) |
|---|---|---|---|
| (-1,0) | (-1,0) | (0,1) | (0,-1) |
| (0,1) | (0,1) | (1,0) | (-1,0) |
| (0,1) | (0,1) | (1,0) | (-1,0) |

$C_4^3=$

| (-1,0) | (1,0) | (0,1) | (0,1) |
|---|---|---|---|
| (1,0) | (-1,0) | (0,-1) | (0,-1) |
| (0,-1) | (0,1) | (-1,0) | (-1,0) |
| (0,-1) | (0,1) | (-1,0) | (-1,0) |

G4 $C_1^4=$

| (1,0) | (1,0) | (0,1) | (0,-1) |
|---|---|---|---|
| (1,0) | (1,0) | (0,1) | (0,-1) |
| (0,1) | (0,1) | (-1,0) | (1,0) |
| (0,-1) | (0,-1) | (1,0) | (-1,0) |

$C_2^4=$

| (-1,0) | (1,0) | (0,-1) | (0,-1) |
|---|---|---|---|
| (-1,0) | (1,0) | (0,-1) | (0,-1) |
| (0,-1) | (0,1) | (1,0) | (1,0) |
| (0,1) | (0,-1) | (-1,0) | (-1,0) |

$C_3^4=$

| (-1,0) | (-1,0) | (0,-1) | (0,1) |
|---|---|---|---|
| (1,0) | (1,0) | (0,1) | (0,-1) |
| (0,-1) | (0,-1) | (1,0) | (-1,0) |
| (0,-1) | (0,-1) | (1,0) | (-1,0) |

$C_4^4=$

| (1,0) | (-1,0) | (0,1) | (0,1) |
|---|---|---|---|
| (-1,0) | (1,0) | (0,-1) | (0,-1) |
| (0,1) | (0,-1) | (-1,0) | (-1,0) |
| (0,1) | (0,-1) | (-1,0) | (-1,0) |

FIG 15

$$C_1^8=\begin{bmatrix} 1&-1&1&-1&-1&-1&1&1&1&-1&-1&1&1&1&1&1\\ -1&1&-1&1&1&1&-1&-1&-1&1&1&-1&-1&-1&-1&-1\\ -1&1&-1&1&1&1&-1&-1&-1&1&1&-1&-1&-1&-1&-1\\ -1&1&-1&1&1&1&-1&-1&-1&1&1&-1&-1&-1&-1&-1 \end{bmatrix}$$

$$C_2^8=\begin{bmatrix} 1&1&-1&-1&-1&1&-1&1&1&1&1&1&1&-1&-1&1\\ -1&-1&1&1&1&-1&1&-1&-1&-1&-1&-1&-1&1&1&-1\\ -1&-1&1&1&1&-1&1&-1&-1&-1&-1&-1&-1&1&1&-1\\ -1&-1&1&1&1&-1&1&-1&-1&-1&-1&-1&-1&1&1&-1 \end{bmatrix}$$

$$C_3^8=\begin{bmatrix} -1&-1&-1&-1&1&-1&-1&1&-1&-1&1&1&-1&1&-1&1\\ 1&1&1&1&-1&1&1&-1&1&1&-1&-1&1&-1&1&-1\\ 1&1&1&1&-1&1&1&-1&1&1&-1&-1&1&-1&1&-1\\ 1&1&1&1&-1&1&1&-1&1&1&-1&-1&1&-1&1&-1 \end{bmatrix}$$

$$C_4^8=\begin{bmatrix} -1&1&1&-1&1&1&1&1&-1&1&-1&1&-1&-1&1&1\\ 1&-1&-1&1&-1&-1&-1&-1&1&-1&1&-1&1&1&-1&-1\\ 1&-1&-1&1&-1&-1&-1&-1&1&-1&1&-1&1&1&-1&-1\\ 1&-1&-1&1&-1&-1&-1&-1&1&-1&1&-1&1&1&-1&-1 \end{bmatrix}$$

$$C_5^8=\begin{bmatrix} 1&-1&1&-1&-1&-1&1&1&1&-1&-1&1&1&1&1&1\\ 1&-1&1&-1&-1&-1&1&1&1&-1&-1&1&1&1&1&1\\ -1&1&-1&1&1&1&-1&-1&-1&1&1&-1&-1&-1&-1&-1\\ 1&-1&1&-1&-1&-1&1&1&1&-1&-1&1&1&1&1&1 \end{bmatrix}$$

$$C_6^8=\begin{bmatrix} 1&1&-1&-1&-1&1&-1&1&1&1&1&1&1&-1&-1&1\\ 1&1&-1&-1&-1&1&-1&1&1&1&1&1&1&-1&-1&1\\ -1&-1&1&1&1&-1&1&-1&-1&-1&-1&-1&-1&1&1&-1\\ 1&1&-1&-1&-1&1&-1&1&1&1&1&1&1&-1&-1&1 \end{bmatrix}$$

$$C_7^8=\begin{bmatrix} -1&-1&-1&-1&1&-1&-1&1&-1&-1&1&1&-1&1&-1&1\\ -1&-1&-1&-1&1&-1&-1&1&-1&-1&1&1&-1&1&-1&1\\ 1&1&1&1&-1&1&1&-1&1&1&-1&-1&1&-1&1&-1\\ -1&-1&-1&-1&1&-1&-1&1&-1&-1&1&1&-1&1&-1&1 \end{bmatrix}$$

$$C_8^8=\begin{bmatrix} -1&1&1&-1&1&1&1&1&-1&1&-1&1&-1&-1&1&1\\ -1&1&1&-1&1&1&1&1&-1&1&-1&1&-1&-1&1&1\\ 1&-1&-1&1&-1&-1&-1&-1&1&-1&1&-1&1&1&-1&-1\\ -1&1&1&-1&1&1&1&1&-1&1&-1&1&-1&-1&1&1 \end{bmatrix}$$

| (-1,0) | (1,0) | (-1,0) | (1,0) | (0,-1) | (-1,0) | (0,1) | (1,0) | (1,0) | (1,0) | (1,0) | (1,0) | (0,-1) | (1,0) | (0,1) | (-1,0) |
|---|---|---|---|---|---|---|---|---|---|---|---|---|---|---|---|
| (1,0) | (-1,0) | (1,0) | (-1,0) | (0,1) | (1,0) | (0,-1) | (-1,0) | (-1,0) | (-1,0) | (-1,0) | (-1,0) | (0,1) | (-1,0) | (0,-1) | (1,0) |
| (0,1) | (0,-1) | (0,1) | (0,-1) | (-1,0) | (0,1) | (1,0) | (0,-1) | (0,-1) | (0,-1) | (0,-1) | (0,-1) | (-1,0) | (0,-1) | (1,0) | (0,1) |
| (0,1) | (0,-1) | (0,1) | (0,-1) | (-1,0) | (0,1) | (1,0) | (0,-1) | (0,-1) | (0,-1) | (0,-1) | (0,-1) | (-1,0) | (0,-1) | (1,0) | (0,1) |

$c_2^1 =$

| (1,0) | (0,1) | (-1,0) | (0,-1) | (0,1) | (0,-1) | (0,1) | (0,-1) | (-1,0) | (0,1) | (1,0) | (0,-1) | (0,1) | (0,1) | (0,1) | (0,1) |
|---|---|---|---|---|---|---|---|---|---|---|---|---|---|---|---|
| (-1,0) | (0,-1) | (1,0) | (0,1) | (0,-1) | (0,1) | (0,-1) | (0,1) | (1,0) | (0,-1) | (-1,0) | (0,1) | (0,1) | (0,-1) | (0,-1) | (0,-1) |
| (0,-1) | (1,0) | (0,1) | (-1,0) | (1,0) | (-1,0) | (1,0) | (-1,0) | (0,1) | (1,0) | (0,-1) | (-1,0) | (1,0) | (1,0) | (1,0) | (1,0) |
| (0,-1) | (1,0) | (0,1) | (-1,0) | (1,0) | (-1,0) | (1,0) | (-1,0) | (0,1) | (1,0) | (0,-1) | (-1,0) | (1,0) | (1,0) | (1,0) | (1,0) |

G1

$c_3^1 =$

| (1,0) | (1,0) | (1,0) | (1,0) | (0,1) | (-1,0) | (0,-1) | (1,0) | (-1,0) | (1,0) | (-1,0) | (1,0) | (0,1) | (1,0) | (0,-1) | (-1,0) |
|---|---|---|---|---|---|---|---|---|---|---|---|---|---|---|---|
| (-1,0) | (-1,0) | (-1,0) | (-1,0) | (0,-1) | (1,0) | (0,1) | (-1,0) | (1,0) | (-1,0) | (1,0) | (-1,0) | (0,-1) | (-1,0) | (0,1) | (1,0) |
| (0,-1) | (0,-1) | (0,-1) | (0,-1) | (1,0) | (0,1) | (-1,0) | (0,-1) | (0,1) | (0,-1) | (0,1) | (0,-1) | (1,0) | (0,-1) | (-1,0) | (0,1) |
| (0,-1) | (0,-1) | (0,-1) | (0,-1) | (1,0) | (0,1) | (-1,0) | (0,-1) | (0,1) | (0,-1) | (0,1) | (0,-1) | (1,0) | (0,-1) | (-1,0) | (0,1) |

$c_4^1 =$

| (1,0) | (0,-1) | (-1,0) | (0,1) | (0,1) | (0,1) | (0,1) | (0,1) | (-1,0) | (0,-1) | (1,0) | (0,1) | (0,1) | (0,-1) | (0,1) | (0,-1) |
|---|---|---|---|---|---|---|---|---|---|---|---|---|---|---|---|
| (-1,0) | (0,1) | (1,0) | (0,-1) | (0,-1) | (0,-1) | (0,-1) | (0,-1) | (1,0) | (0,1) | (-1,0) | (0,-1) | (0,-1) | (0,1) | (0,-1) | (0,1) |
| (0,-1) | (-1,0) | (0,1) | (1,0) | (1,0) | (1,0) | (1,0) | (1,0) | (0,1) | (-1,0) | (0,-1) | (1,0) | (1,0) | (-1,0) | (1,0) | (-1,0) |
| (0,-1) | (-1,0) | (0,1) | (1,0) | (1,0) | (1,0) | (1,0) | (1,0) | (0,1) | (-1,0) | (0,-1) | (1,0) | (1,0) | (-1,0) | (1,0) | (-1,0) |

FIG 16B

| | | | | | | | | | | | | | | | | |
|---|---|---|---|---|---|---|---|---|---|---|---|---|---|---|---|---|
| $C_5^1=$ | (1,0) | (-1,0) | (1,0) | (-1,0) | (0,1) | (1,0) | (0,-1) | (-1,0) | (-1,0) | (-1,0) | (-1,0) | (-1,0) | (0,1) | (-1,0) | (0,-1) | (1,0) |
| | (1,0) | (-1,0) | (1,0) | (-1,0) | (0,1) | (1,0) | (0,-1) | (-1,0) | (-1,0) | (-1,0) | (-1,0) | (-1,0) | (0,1) | (-1,0) | (0,-1) | (1,0) |
| | (0,-1) | (0,1) | (0,-1) | (0,1) | (1,0) | (0,-1) | (-1,0) | (0,1) | (0,1) | (0,1) | (0,1) | (0,1) | (1,0) | (0,1) | (-1,0) | (0,-1) |
| | (0,1) | (0,-1) | (0,1) | (0,-1) | (-1,0) | (0,1) | (1,0) | (0,-1) | (0,-1) | (0,-1) | (0,-1) | (0,-1) | (-1,0) | (0,-1) | (1,0) | (0,1) |

| | | | | | | | | | | | | | | | | |
|---|---|---|---|---|---|---|---|---|---|---|---|---|---|---|---|---|
| $C_6^1=$ | (-1,0) | (0,-1) | (1,0) | (0,1) | (0,-1) | (0,1) | (0,-1) | (0,1) | (1,0) | (0,-1) | (-1,0) | (0,1) | (0,-1) | (0,-1) | (0,-1) | (0,-1) |
| | (-1,0) | (0,-1) | (1,0) | (0,1) | (0,-1) | (0,1) | (0,-1) | (0,1) | (1,0) | (0,-1) | (-1,0) | (0,1) | (0,-1) | (0,-1) | (0,-1) | (0,-1) |
| | (0,1) | (-1,0) | (0,-1) | (1,0) | (-1,0) | (1,0) | (-1,0) | (1,0) | (0,-1) | (-1,0) | (0,1) | (1,0) | (-1,0) | (-1,0) | (-1,0) | (-1,0) |
| | (0,-1) | (1,0) | (0,1) | (-1,0) | (1,0) | (-1,0) | (1,0) | (-1,0) | (0,1) | (1,0) | (0,-1) | (-1,0) | (1,0) | (1,0) | (1,0) | (1,0) |

G1

| | | | | | | | | | | | | | | | | |
|---|---|---|---|---|---|---|---|---|---|---|---|---|---|---|---|---|
| $C_7^1=$ | (-1,0) | (-1,0) | (-1,0) | (-1,0) | (0,-1) | (1,0) | (0,1) | (-1,0) | (1,0) | (-1,0) | (1,0) | (-1,0) | (0,-1) | (-1,0) | (0,1) | (1,0) |
| | (-1,0) | (-1,0) | (-1,0) | (-1,0) | (0,-1) | (1,0) | (0,1) | (-1,0) | (1,0) | (-1,0) | (1,0) | (-1,0) | (0,-1) | (-1,0) | (0,1) | (1,0) |
| | (0,1) | (0,1) | (0,1) | (0,1) | (-1,0) | (0,-1) | (1,0) | (0,1) | (0,-1) | (0,1) | (0,-1) | (0,1) | (-1,0) | (0,1) | (1,0) | (0,-1) |
| | (0,-1) | (0,-1) | (0,-1) | (0,-1) | (1,0) | (0,1) | (-1,0) | (0,-1) | (0,1) | (0,-1) | (0,1) | (0,-1) | (1,0) | (0,-1) | (-1,0) | (0,1) |

| | | | | | | | | | | | | | | | | |
|---|---|---|---|---|---|---|---|---|---|---|---|---|---|---|---|---|
| $C_8^1=$ | (-1,0) | (0,1) | (1,0) | (0,-1) | (0,-1) | (0,-1) | (0,-1) | (0,-1) | (1,0) | (0,1) | (-1,0) | (0,-1) | (0,-1) | (0,1) | (0,-1) | (0,1) |
| | (-1,0) | (0,1) | (1,0) | (0,-1) | (0,-1) | (0,-1) | (0,-1) | (0,-1) | (1,0) | (0,1) | (-1,0) | (0,-1) | (0,-1) | (0,1) | (0,-1) | (0,1) |
| | (0,1) | (1,0) | (0,-1) | (-1,0) | (-1,0) | (-1,0) | (-1,0) | (-1,0) | (0,-1) | (1,0) | (0,1) | (-1,0) | (-1,0) | (1,0) | (-1,0) | (1,0) |
| | (0,-1) | (-1,0) | (0,1) | (1,0) | (1,0) | (1,0) | (1,0) | (1,0) | (0,1) | (-1,0) | (0,-1) | (1,0) | (1,0) | (-1,0) | (1,0) | (-1,0) |

FIG 17
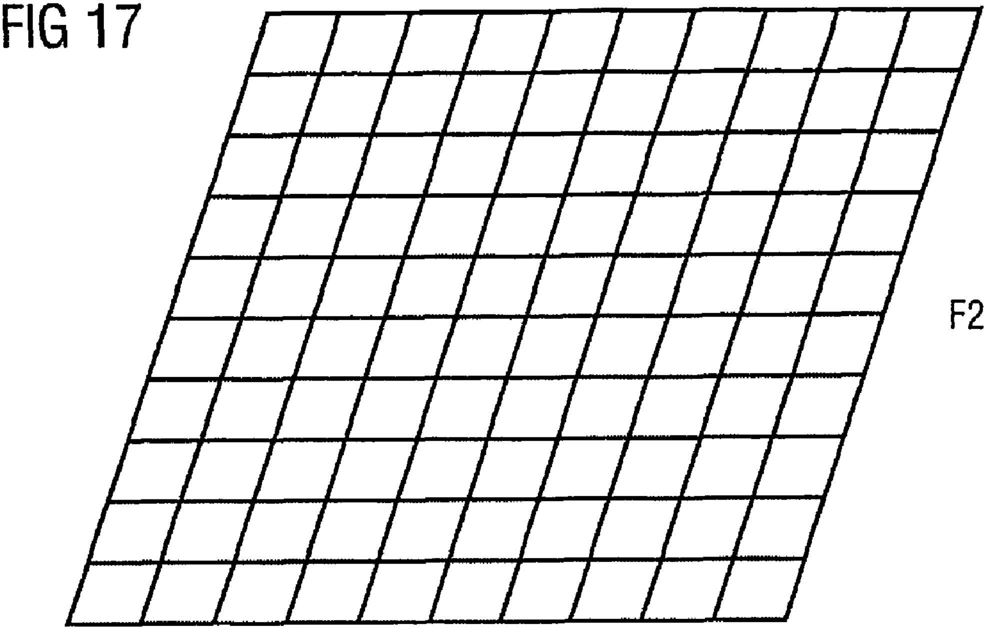
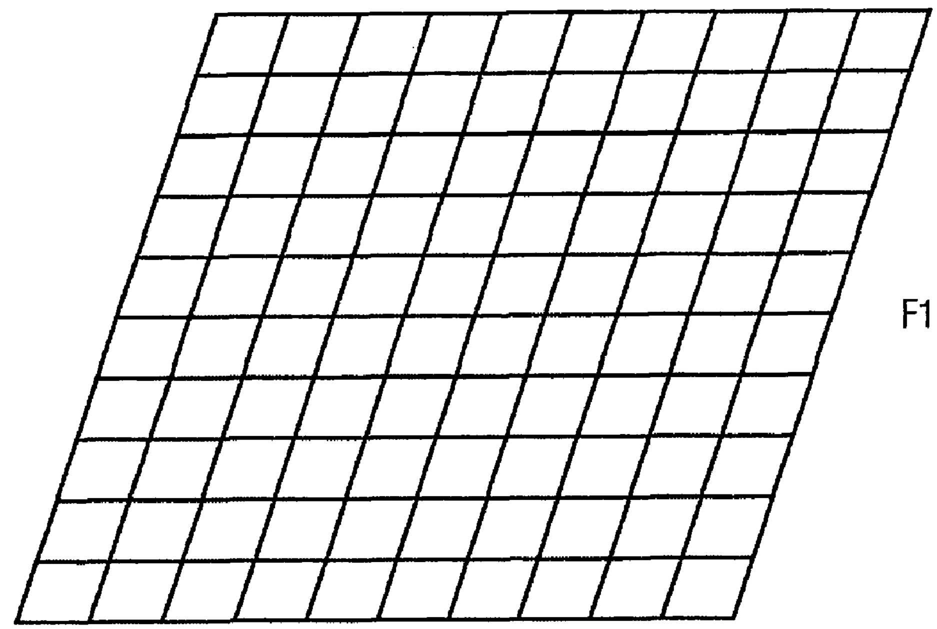

FIG 19
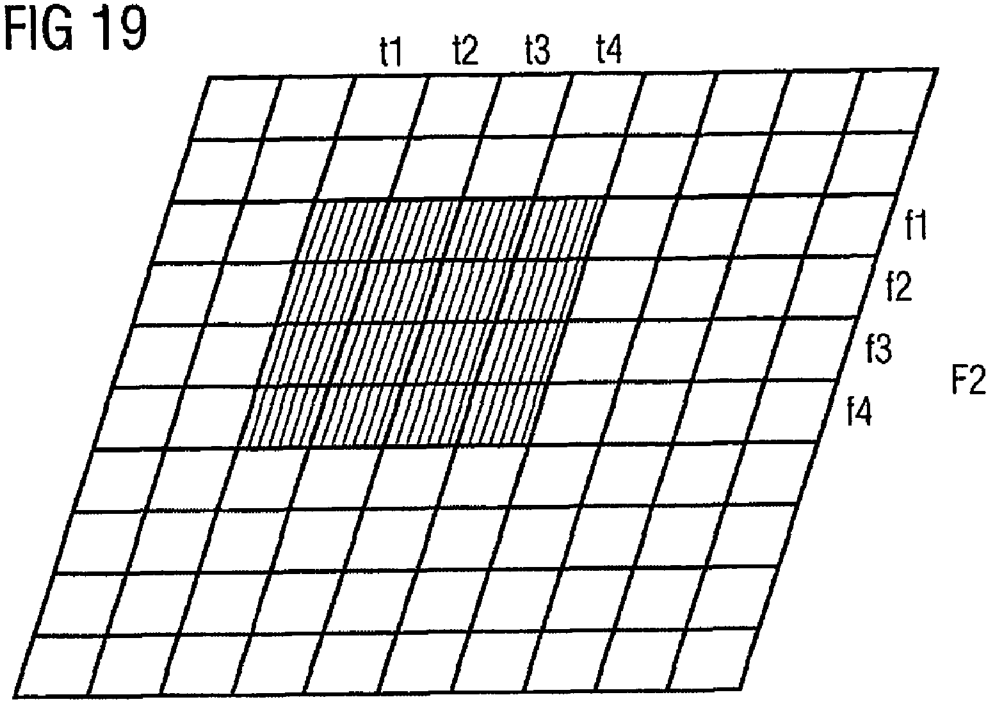
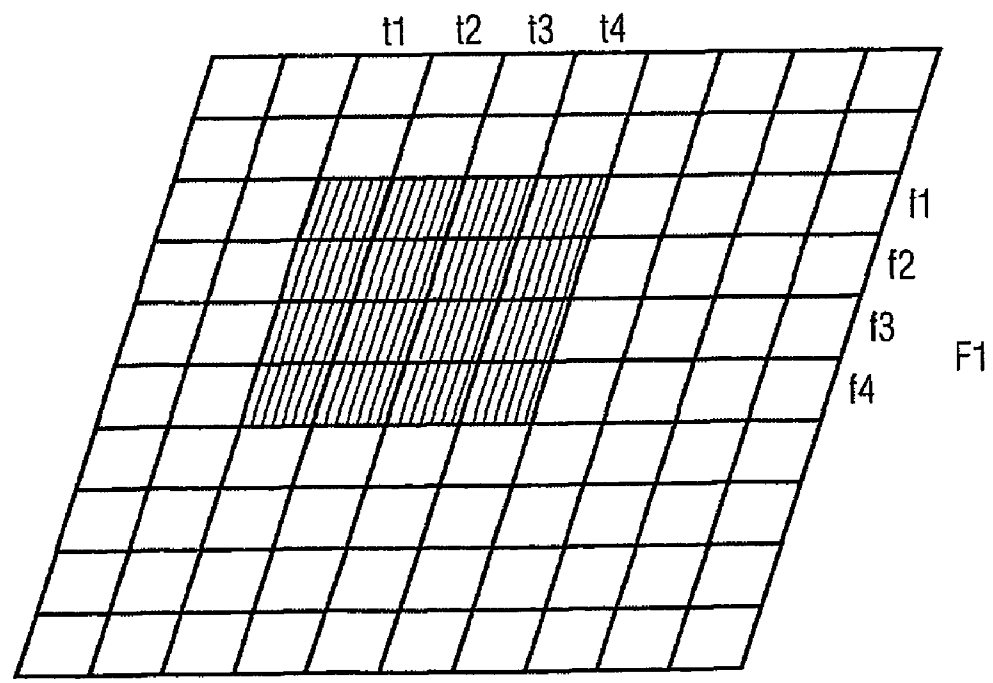

FIG 20
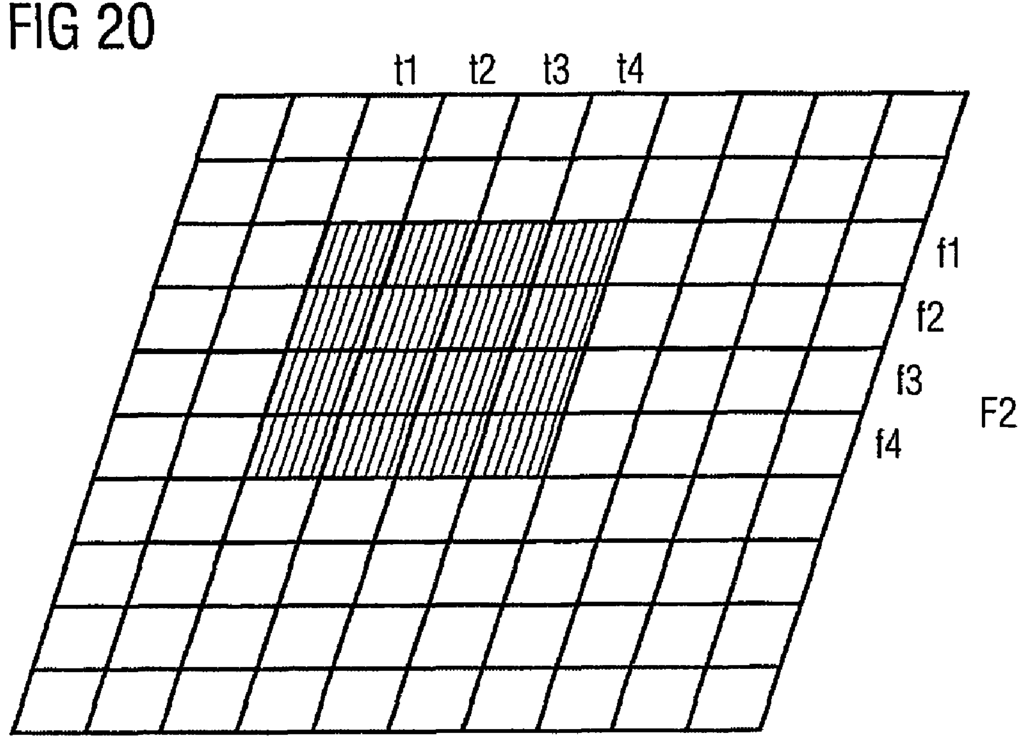
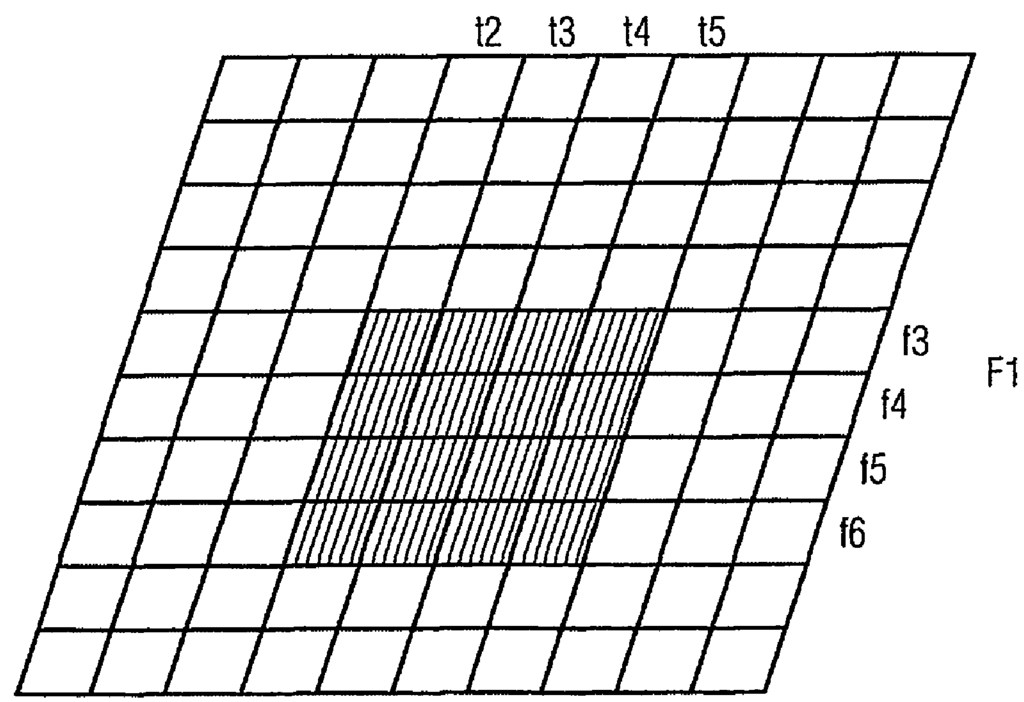

METHOD, EMITTER AND RECEIVER FOR TRANSMITTING DATA IN A MULTI-ACCESS CDMA SYSTEM BY FULLY COMPLEMENTARY CODE MATRIXES FOR TWO-DIMENSIONAL DATA SPREADING IN A FREQUENCY AND TIME DIRECTION

CROSS REFERENCE TO RELATED APPLICATIONS

This application is based on and hereby claims priority to PCT Application No. PCT/EP2004/050593 filed on Apr. 23, 2004 and European Application No. 03009464.4 filed on Apr. 25, 2003, the contents of which are hereby incorporated by reference.

BACKGROUND OF THE INVENTION

The invention relates to a method for transmitting data bits between at least one subscriber station and a radio access arrangement in a radio communication system. The invention also relates to a transmit device for transmitting data bits to a receiver in a radio communication system and a receive device for processing data bits.

In radio communication systems information (for example voice, image information, video information, SMS (Short Message Service) and other data) is transmitted with the aid of electromagnetic waves via a radio interface between the transmitting and receiving stations. The electromagnetic waves are thereby emitted at carrier frequencies that are within the frequency band provided for the respective system. A radio communication system hereby comprises subscriber stations, e.g. mobile stations, radio access arrangements, such as base stations or node Bs, and in some instances further network-side arrangements.

Access by stations to the common radio resources of the transmission medium, e.g. time, space, frequency and power, in radio communication systems is controlled by multiple access MA methods.

Some third generation radio communication systems use a Code Division Multiple Access CDMA method. One such example is WCDMA (Wideband CDMA) systems. These include the FDD (Frequency Division Duplex) components of the UMTS (Universal Mobile Telecommunications System) standard in Europe and the US cdma2000.

With CDMA methods the information to be transmitted is coded using a spreading code, which is made up of a series of so-called chips. Despreading in the receiver takes place by multiplication by the spreading code. If the spreading codes of different subscriber stations are orthogonal, in the case of synchronous data transmission the signals from other subscriber stations can be completely suppressed by despreading.

With direct-sequence CDMA methods, such as IS-95, cdma2000 and WCDMA, the bits to be transmitted are multiplied by a spreading code and then transmitted as a sequence of chips one after the other. In Chen, H. H., Yeh, J. F., Suehiro, N: "A multicarrier CDMA architecture based on orthogonal complete complementary codes for new generations of wideband wireless communications", IEEE Communications magazine, vol. 39, October 2001, pages 126-134, the use of actual one-dimensional complete complementary spreading codes is proposed for data transmission. It is then possible to start to transmit a data bit before all the chips of the preceding data bit have been sent.

SUMMARY OF THE INVENTION

One possible object of the invention is to demonstrate an efficient method of the type mentioned above for transmitting digital data using spreading codes, as well as a transmit device to implement such a method and a receive device to process data thus transmitted.

The inventors propose a method for transmitting data bits between at least one subscriber station and a radio access arrangement in a radio communication system in which every data bit is transmitted on at least two different units of a first radio resource. On the transmitter side the data bits are spread for each unit of the first radio resource such that every data bit respectively is multiplied by a code matrix of the same group of code matrices for the units of the first radio resource. The lines of the code matrices hereby respectively represent a spreading code relating to a second radio resource and the columns of the code matrices respectively represent a spreading code relating to a third radio resource. The code matrices used for spreading are such that

- there are at least two groups of code matrices, each group containing the same number of numbered code matrices,
- for every group the sum of the autocorrelations of all code matrices is only not equal to zero in the case of vanishing two-dimensional displacement,
- for all pairs of two respective groups the sum of the cross-correlations of all code matrices of the respective two groups that correspond due to their numbering is equal to zero for vanishing and non-vanishing two-dimensional displacement.

Every data bit is transmitted on the at least two different units of the first radio resource in combination with a number of units of the second radio resource predefined by the spread and a number of units of the third radio resource predefined by the spread.

The method for transmitting data bits can relate to both upward transmission (uplink, UL) and downward transmission (downlink, DL). The transmitter for the method can therefore be either a subscriber station or a radio access arrangement of the radio communication system, for example a base station or a radio access point. There is a first radio resource, for example frequency, time or space, which is divided into units, such as frequency bands. Every data bit to be transmitted is transmitted on a number of units of the first radio resource.

A group of code matrices is used to spread a data bit. The data bit is multiplied by a different code matrix from this group for every unit of the first radio resource. The code matrices used are complete complementary code matrices. The following then applies:

- There are a number of groups of code matrices, each containing the same number of code matrices.
- The autocorrelation of a code matrix in the case of vanishing two-dimensional displacement is calculated from the sum of the squares of the individual code matrix entries. Two-dimensional displacement is thereby achieved by displacing the code matrix to the right or left or up or down in relation to itself. In such a case of non-vanishing displacement autocorrelation is calculated as the sum of the products of the matrix entries above each other. The sum of the autocorrelations of all code matrices of a group is equal to zero when there is two-dimensional displacement. The same displacement must hereby be applied for every code matrix of the group when calculating the autocorrelations. Only if there is no displacement is the sum of the autocorrelations of all the code matrices of the group not equal to zero.

The following applies with regard to the cross-correlation characteristics of the code matrices of a group: Regardless of any displacement the sum of the cross-correlations of all code matrices from two respective groups that correspond due to their numbering is equal to zero. This means that if there are two groups of code matrices, the cross-correlation between the first code matrix of the first group and the first code matrix of the second group for a defined displacement plus the cross-correlation between the second code matrix of the first group and the second code matrix of the second group for the same displacement plus the cross-correlation between the third code matrix of the first group and the third code matrix of the second group for the same displacement and so on is equal to zero. This applies to any two groups in pairs when there are a number of groups.

After the transmitter-side spreading of the data bit for every unit of the first radio resource, the spread data bit, i.e. the chips, are transmitted on the number of units of the first radio resource. To this end a defined number of units of the second and third radio resource are deployed according to the spread.

In one embodiment, the code matrices used for spreading are such that they can be derived using a formula from one or more sets of vector groups. Within each set of vector groups each vector group contains the same number of numbered vectors, for every group the sum of the autocorrelations for all vectors is only not equal to zero in the case of vanishing one-dimensional displacement and the sum of the cross-correlations of all vectors of the respective two groups that correspond due to their numbering is equal to zero for vanishing and non-vanishing one-dimensional displacement for all pairs of two respective groups.

These vectors are complete complementary code vectors, the characteristics of which are proposed for example in the references quoted above. Examples of formulae for deriving the code matrices used for spreading from the one-dimensional code vectors are shown below in the exemplary embodiment in formulae 1 to 4.

At least two subscriber stations of the radio communication system are advantageously allocated a mutually different group of code matrices. This allows simultaneous communication by the at least two subscriber stations with the radio access arrangement: the at least two subscriber stations can send signals to the radio access arrangement simultaneously using the group of code matrices assigned respectively to them and the radio access arrangement can simultaneously transmit different signals to the at least two subscriber stations using the different groups of code matrices allocated to the at least two subscriber stations. The cross-correlation characteristics of the groups of code matrices described allow separation of the signals spread using different groups of code matrices in the receiver. It is possible in particular to allocate a specific group of code matrices to each subscriber station for communication with the radio access arrangement. In this case the number of existing groups of code matrices cannot be less than the number of communicating subscriber stations.

In one embodiment, a group of code matrices and second and/or third radio resources are allocated to at least one subscriber station. This is particularly advantageous, if the same group of code matrices is allocated to a number of subscriber stations. In this case the signals sent using the same group of code matrices to or from said subscriber stations can be separated using the allocated second and/or third radio resources. These second and/or third radio resources or the respectively assigned units of the second and third radio resources should then be different or not overlap for the subscriber stations with the same group of code matrices. With this procedure the number of subscriber stations communicating with the radio access arrangement can be greater than the number of code matrices used.

Every data bit for every unit of the first radio resource is preferably transmitted on the same or corresponding units of the second and third radio resources. This allows simple processing of the chips in the receiver. It is however also possible to use different, non-corresponding units of the second and third radio resources for every unit of the first radio resource.

In another embodiment, the units of the second radio resource in combination with the units of the third radio resource used to transmit at least two successive data bits for at least one unit of the first radio resource overlap to an extent. While it is possible for the units of the second and third radio resources to overlap fully for every unit of the first radio resource for data bits which are spread using different groups of code matrices, when using a single group of code matrices for different data bits there can only be partial overlapping of the units of the second and third radio resources for every unit of the first radio resource. Such overlapping allows particularly efficient utilization of the radio resources and adjustment of the data rate to current requirements.

In particular the units of the second radio resource in combination with the units of the third radio resource used to transmit at least two successive data bits for at least one unit of the first radio resource can be defined on the transmitter side according to a pattern. The pattern thereby specifies the number of units in the direction of the second and/or third radio resource by which the radio resources used for a subsequent data bit have been displaced compared with the preceding data bit. The pattern can vary from subscriber station to subscriber station and can be a function for example of the current resource utilization of the radio communication system.

In one embodiment, correlation of the received spread data bits with a code matrix of the group of code matrices used on the transmitter side and summation of the correlation results over the different units of the first radio resource are carried out on the receiver side for the at least two different units of the first radio resource. These calculations use the autocorrelation and cross-correlation characteristics of the code matrices used as described above. The chips received on each unit of the first radio resource are hereby correlated with the respective code matrix used by the transmitter on this unit of the first radio resource for spreading purposes. Summation of these correlation results from the individual units of the first radio resource then takes place.

The above-mentioned object relating to the transmit device can be achieved by a transmitter.

The transmit device for transmitting data bits to a receiver in a radio communication system has a transmitter to transmit each data bit on at least two different units of a first radio resource, as well as means for spreading the data bits for every unit of the first radio resource such that every data bit is multiplied respectively by a mode matrix of the same group of code matrices for the units of the first radio resource, with the lines of the code matrices respectively representing a spreading code relating to a second radio resource and the columns of the code matrices respectively representing a spreading code relating to a third radio resource. The code matrices used for spreading are such that there are at least two groups of code matrices, each group containing the same number of numbered code matrices, for every group the sum of the autocorrelations of all code matrices is only not equal to zero in the case of vanishing two-dimensional displacement, for all pairs of two respective groups the sum of the cross-correlations of all code matrices of the respective two groups that correspond due to their numbering is equal to zero for vanishing and non-vanishing two-dimensional displacement.

The transmit device also has a transmitter to transmit each data bit on the at least two different units of the first radio resource in combination with a number of units of the second radio resource predefined by the spread and a number of units of the third radio resource predefined by the spread.

The transmit device is particularly suitable for implementing the method.

The above-mentioned object relating to the receive device is achieved by a receive device.

The proposed receive device for processing data bits transmitted has means for calculating correlations for the at least two different units of the first radio resource respectively between the received spread data bits and a code matrix of the group of code matrices used on the transmit side and means for calculating sums of correlation results over the different units of the first radio resource.

The receive device is particularly suitable for implementing the receiver-side steps of the method.

Both the transmit device and the receive device can be configured both as subscriber stations and as radio access arrangements of a radio communication system.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows two groups of actual one-dimensional complete complementary spreading codes of length 4, FIG. 3 shows a group of actual square code matrices of dimension 4×4, FIG. 4 shows a two-dimensional matrix displacement, FIG. 5 shows four groups of actual one-dimensional complete complementary spreading codes of length 16, FIG. 6*a* shows two actual square code matrices of dimension 16×16 from a group of code matrices, FIG. 6*b* shows two further actual square code matrices of dimension 16×16 from a group of code matrices, FIG. 7 shows two groups of complex one-dimensional complete complementary spreading codes of length 4, FIG. 8 shows two groups of complex square code matrices of dimension 4×4, FIG. 9 shows a complex square code matrix from FIG. 8, FIG. 10 shows a group of actual rectangular code matrices of dimension 16×4, FIG. 11*a* shows two groups of complex one-dimensional complete complementary spreading codes of length 16, FIG. 11*b* shows two further groups of complex one-dimensional complete complementary spreading codes of length 16, FIG. 12*a* shows a first section of complex rectangular code matrices from a group of code matrices of dimension 16×4, FIG. 12*b* shows a second section of complex rectangular code matrices from a group of code matrices of dimension 16×4, FIG. 13*a* shows four groups of actual square code matrices of dimension 4×4, FIG. 13*b* shows four groups of actual square code matrices of dimension 2×2, FIG. 14 shows four groups of complex square code matrices of dimension 4×4, FIG. 15 shows a group of actual rectangular code matrices of dimension 16×4, FIG. 16*a* shows a first section of eight complex rectangular code matrices of a group of code matrices of dimension 16×4, FIG. 16*b* shows a second section of eight complex rectangular code matrices of a group of code matrices of dimension 16×4, FIG. 17 shows two frequency-time planes, FIG. 19 shows a schematic diagram of a first transmission of a data bit on two planes, FIG. 20 shows a schematic diagram of a second transmission of a data bit on two planes.

DETAILED DESCRIPTION OF THE PREFERRED EMBODIMENT

Figure 2:
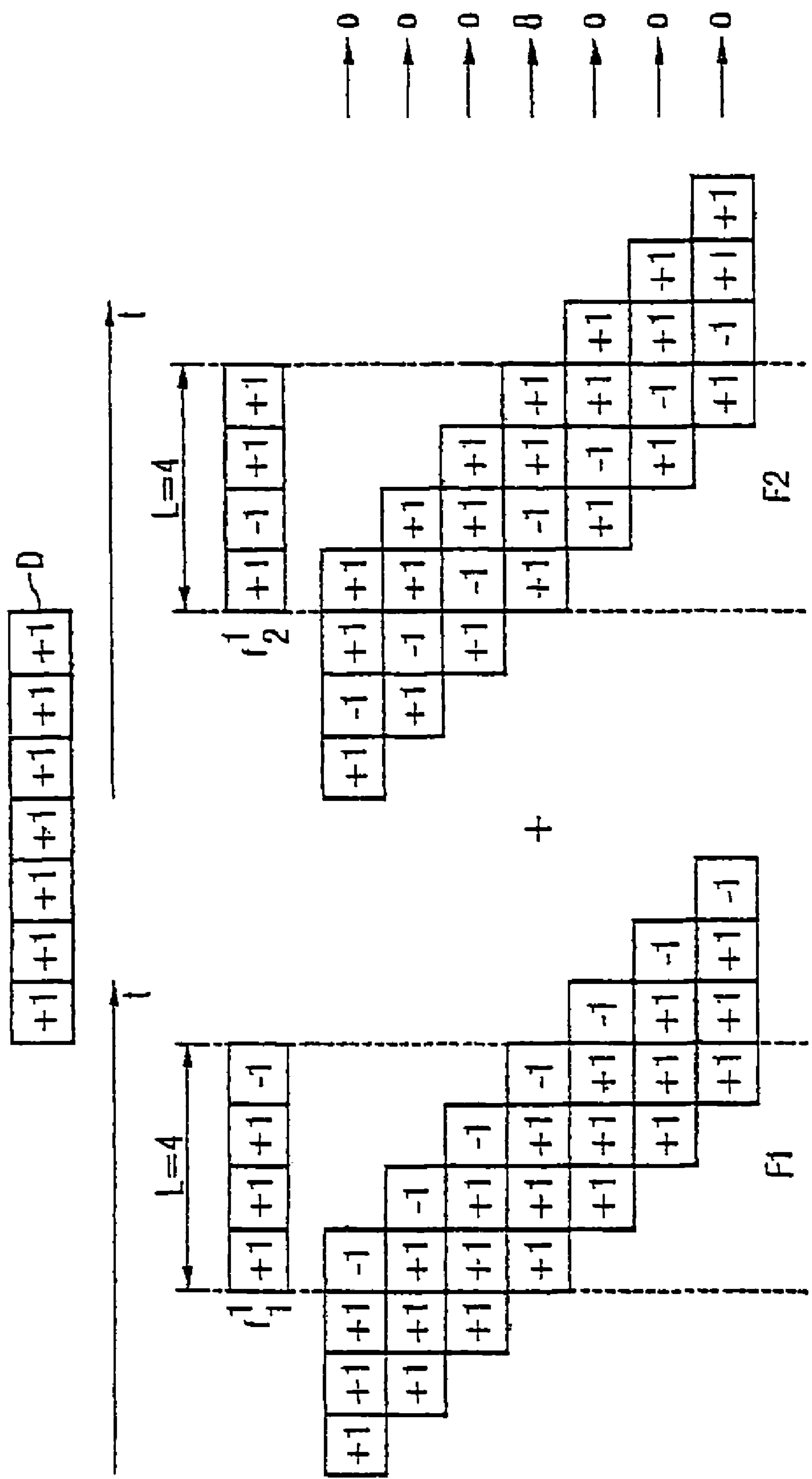
FIG. 2 shows a data transmission using a one-dimensional channel according to the related art.

Reference will now be made in detail to the preferred embodiments of the present invention, examples of which are illustrated in the accompanying drawings, wherein like reference numerals refer to like elements throughout.

The use of one-dimensional complete complementary spreading codes (Complete Complementary Codes CCC) is first described below. To this end FIG. 1 shows two groups g1 and g2 of such spreading codes, the first group g1 comprising the vectors $f_1^1$ and $f_2^1$ and the second group g2 comprising the vectors $f_1^2$ and $f_2^2$.

The autocorrelation of a vector with vanishing displacement is defined as the sum of the squares of the individual components of the vector, i.e. (+1).(+1)+(+1).(+1)+(+1).(+1)+(−1). (−1)=4 for example for the vector $f_1^1$. With a displacement of +1, i.e. one to the right, the autocorrelation of a vector is the sum of the products of the three vector components above each other, i.e. (+1).(+1)+(+1).(+1)+(−1).(+1)=1 for example for the vector $f_1^1$. Complete complementary spreading codes have the characteristic that the sum of the autocorrelations of all vectors of a group is only not equal to zero in the case of vanishing one-dimensional displacement. The autocorrelation for the vector $f_2^1$ with a displacement of +1 thus results according to (−1).(+1)+(+1).(−1)+(+1).(+1)=−1. The sum of the two autocorrelations of the vectors $f_1^1$ and $f_2^1$ of the group g1 with a displacement of +1 is therefore zero. A value that is not zero, namely the value 8, only results with a vanishing displacement for the sum of the two autocorrelations of the vectors $f^1{}_1$ and $f_2{}^1$ of the group g1.

The cross-correlations of two vectors with vanishing displacement is defined as the sum of the products of the individual components of the different vectors, i.e. (+1).(+1)+(+1).(+1)+(+1).(−1)+(−1).(+1)=0 for the vectors $f_1{}^1$ and $f_1{}^2$. Correspondingly the cross-correlation of two vectors with non-vanishing displacement results as the sum of the products of the vector components above each other, i.e. for the vectors $f_1{}^1$ and $f_1{}^2$ for example with a displacement of +2 according to (+1).(+1)+(−1).(+1)=0. Complete complementary spreading codes have the characteristic that for two groups respectively the sum of the cross-correlations of all vectors for vanishing and non-vanishing one-dimensional displacement that correspond due to their numbering is equal to zero. With the two groups g1 and g2 the vectors $f_1{}^1$ and $f_1{}^2$ respectively correspond, as do the vectors $f_2{}^1$ and $f_2{}^2$. A value of zero therefore results for example with the summation of the cross-correlations with a displacement of +1 of the two vectors $f_1{}^1$ and $f_1{}^2$ and the cross-correlation with a displacement of +1 of the two vectors $f_2{}^1$ and $f_2{}^2$. If there are more than two groups of vectors, this statement applies to all pairs that can be formed from groups.

FIG. 2 shows a schematic diagram of the transmission of data bits D, which in the example being considered comprise a series of ones, using two one-dimensional channels, characterized by the radio resource time. In FIG. 2 therefore the progress of the time t is shown to the right. The two channels are also characterized by a radio resource in the form of a radio frequency F1 and F2. On the first channel with radio frequency F1 the individual bits of the data bit D are transmitted using the vector $f_1{}^1$ of length L of four chips as the spreading code. The chips of the individual bits are thereby not transmitted consecutively but with temporal overlay. Therefore the second chip (i.e. +1) of the first bit is transmitted at the same time as the first chip (i.e. +1) of the second bit. The transmitter therefore transmits the value +2. This overlaying of the chips means that the modulation method must be configured such that (L+1) different values can be transmitted within the duration of a chip. In particular with spreading codes with long lengths L, this makes great demands on the modulation method to be used. On the second channel with the radio frequency F2 the individual bits of the data bit D are transmitted simultaneously using the vector $f_2{}^1$ of length L of four chips as the spreading code, as described for the channel with the radio frequency F1.

The receiver correlates four received chips respectively with the respective spreading vector, i.e. with $f_1{}^1$ for the channel with the radio frequency F1 and $f_{21}$ for the channel with the radio frequency F2. This correlation corresponds to the autocorrelation described above with and without displacement of the vectors in respect of each other. Summation of the autocorrelation results of the two channels with the frequencies F1 and F2 then takes place in the receiver. Because of the autocorrelation characteristics of complete complementary spreading codes, as described above, for the sum of correlations calculated in FIG. 2 a positive value of 8 for the sum only results for the fourth bit of the data bit D (shown at the right edge on FIG. 2). The receiver can therefore read the value of a transmitted bit for every calculated correlation over four chips respectively. Compared with direct-spread methods, this procedure has the advantage that every chip sent carries one bit of useful information.

The processing gain, as a measure of the probability of a bit detected in the receiver corresponding to the sent bit, corresponds to the sum of the lengths of the vectors of a group, i.e. 8 for the groups g1 and g2.

If further signals arrive at the receiver together with the chip sequences shown in FIG. 2, having been spread using the vectors $f_1{}^2$ and $f_2{}^2$ of the other group g2 and also having been transmitted on the channels with the radio frequencies F1 and F2, the correlation carried out in the receiver with the vectors $f_1{}^1$ and $f_2{}^1$ in respect of these signals corresponds to the calculation of the cross-correlations described above. The fact that the sums of these cross-correlations assume the value zero regardless of the displacement means that these further signals can be separated from the chip sequence shown in FIG. 2. When using the two groups g1 and g2 therefore data from two users of a radio communication system can be transmitted simultaneously, without mutual interference, by allocating the group g1 to the first user and the group g2 to the second user. Because of the temporal synchronization of the transmission of signals to different users, this applies in particular to downlink DL transmission. With uplink UL data transmission the signals from different users are generally not fully synchronous but are slightly displaced in respect of each other. With displacement by a whole number of chip durations the signals from the different users can be separated completely at the receiver due to the cross-correlation characteristics of the vectors $f_1{}^1$, $f_2{}^1$, $f_1{}^2$ and $f_2{}^2$. If the signal displacement is a fraction of a chip duration however, mutual interference occurs, although this is less perceptible than with conventional CDMA methods.

Matrices are used to spread the data bits to be transmitted. These matrices can be obtained in different ways from one-dimensional complete complementary spreading codes.

It is assumed below that there are N groups of linear complete complementary spreading codes with N vectors respectively. The nth vector of the kth group is referred to as $f_n{}^k$ and has $L=N^2$ components: $f_n{}^k(f_{n,1k}, f_{n,2}{}^k, \ldots f_{n,L}{}^k)$. The following applies for actual spreading codes: $f_{n,i}{}^k \in \{\pm 1\}$.

The nth matrix of the kth group is referred to as $C_n{}^k$, with $C_{n,i}{}^k$ representing the ith column of the matrix $C_n{}^k$. The matrix $C_n{}^k$ is a matrix of dimension L×L.

An matrix can be calculated according to $$C_{n,i}{}^k = f_{[(n-1) mod\ N]+1}{}^k \times f_{v,i}{}^k \quad \text{(formula 1)},$$

where k=1,2 . . . N, i.e. there are N groups and $$v = \left\lfloor \frac{n-1}{N} + 1 \right\rfloor.$$

The convention ⌊s⌋ thereby represents the largest whole number, which is less than or equal to s.

Multiplication of the formula 1 represents a scalar multiplication of a vector by a component of a vector, i.e. a number.

Each group therefore has $N^2$ matrices. It can be seen that for every group thus calculated the sum of the autocorrelations of all matrices is only not equal to zero in the case of vanishing two-dimensional displacement and that for all pairs of two groups respectively the sum of the cross-correlations of all matrices for vanishing and non-vanishing two-dimensional displacement that correspond due to their numbering is equal to zero. The characteristics of the matrices therefore correspond in respect of autocorrelation and cross-correlation to the characteristics of the underlying one-dimensional complete complementary spreading code.

The value of the autocorrelations for vanishing two-dimensional displacement is (N2)3. As the processing gain corresponds to the sum of the number of matrix entries for all matrices of a group, the value (N2)3 is also equal to the processing gain of matrices when used as a spreading code.

The one-dimensional complete complementary spreading codes of the first group g1, $f_1^1$ and $f_2^1$, as well as the second group g2, $f_1^2$ and $f_2^2$ are shown in FIG. 1 for N=2. This gives the first group G1 of matrices $C_1^1$, $C_2^1$, $C_3^1$ and $C_4^1$ shown in FIG. 3. In this instance a group comprises 4 matrices and the processing gain is 64.

The calculation of autocorrelations is given by way of an example for the matrices in FIG. 3. The calculation of autocorrelations with non-vanishing two-dimensional displacement is considered. The displacement is hereby shown, as in FIG. 4, such that there is overlapping of the six matrix elements in the top two lines and last three columns of the first matrix and the bottom three lines and first three columns of the second matrix. To calculate the correlation of two matrices displaced in respect of each other in such a manner the matrix elements above each other are multiplied respectively together and the calculated products are then added together. The autocorrelation of the matrix $C_1^1$ then results with a displacement according to FIG. 4 from (−1).(+1)+(+1).(−1)+(+1).(+1)+(+1).(+1)+(−1).(−1)+(−1).(+1)=0, the autocorrelation of the matrix $C_2^1$ with the same displacement from (+1).(+1)+(+1).(+1)+(−1).(+1)+(−1).(+1)+(−1).(+1)+(+1).(−1)=0, that of the matrix $C_3^1$ from (−1).(+1)+(+1).(−1)+(+1).(+1)+(−1).(−1)+(+1).(+1)+(+1).(−1)=0 and that of the matrix $C_4^1$ from (+1).(+1)+(+1).(+1)+(−1).(+1)+(+1).(−1)+(+1).(−1)+(−1).(−1)=0. The sum of these four autocorrelations gives the value zero. Autocorrelations for other or vanishing two-dimensional displacements are calculated in a similar manner, as are the cross-correlations with matrices from other groups (not shown in FIG. 3).

Figure 6A:
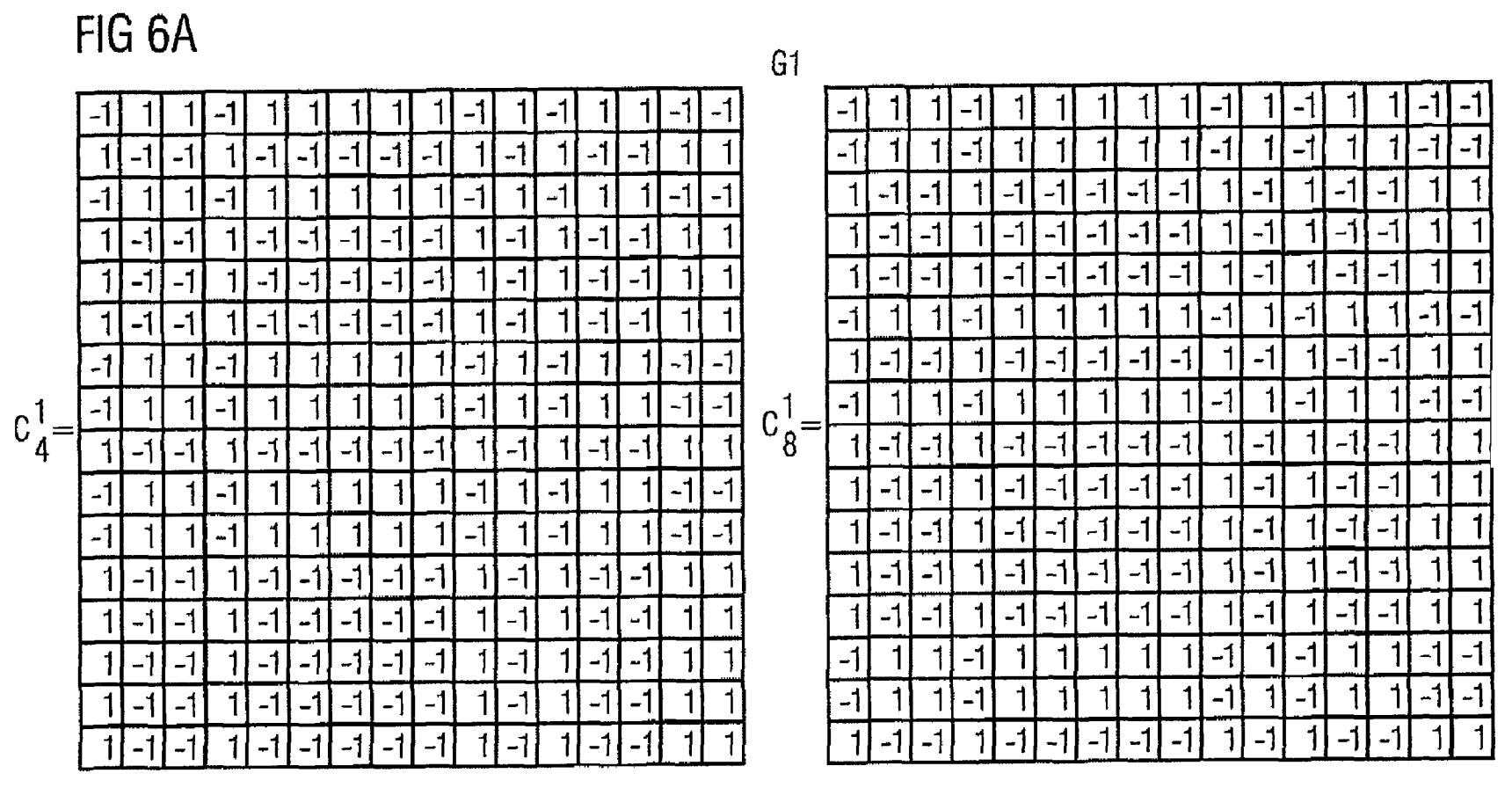
Figure 6B:
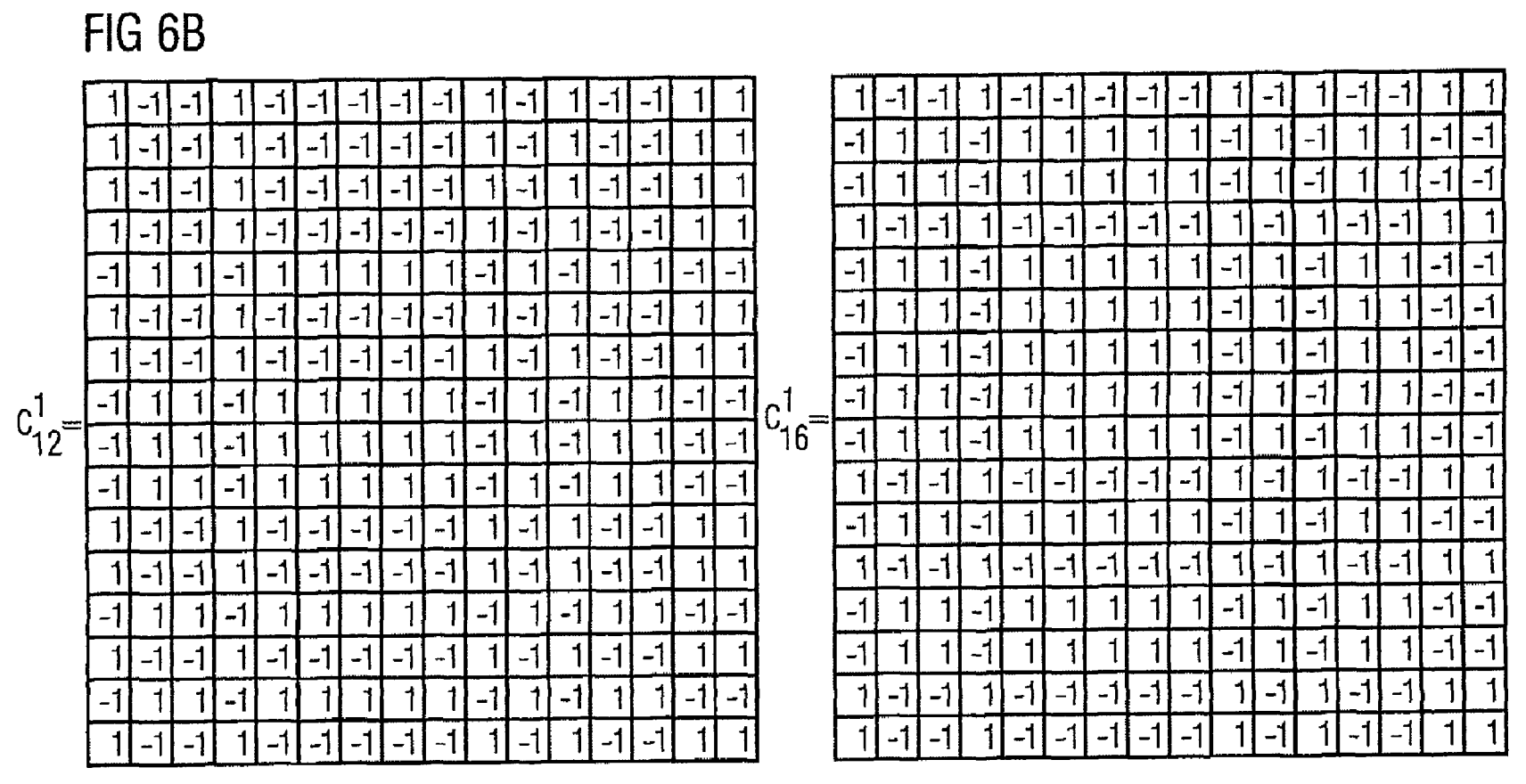

The one-dimensional complete complementary spreading codes of the first group g1, namely the vectors $f_1^1$, $f_2^1$, $f_3^1$ and $f_4^1$, of the second group g2, namely the vectors $f_1^2$, $f_2^2$, $f_3^2$ and $f_4^2$, of the third group g3, namely the vectors $f_1^3$, $f_2^3$, $f_3^3$ and $f_4^3$, and of the fourth group, namely the vectors $f_1^4$, $f_2^4$, $f_3^4$ and $f_4^4$, are shown in FIG. 5. FIGS. 6*a* and 6*b* by way of an example show four code matrices of the first group G1 calculated from the vectors in FIG. 5 in the form of the matrices $C_4^1$, $C_8^1$, $C_{12}^1$ and $C_{16}^1$. Where N=4, each group comprises 16 matrices and the processing gain is 4096.

The formula 1 can also be used to determine matrices from complex one-dimensional complete complementary spreading codes, as proposed for example in Doostnejad, R., Lim, T. J., Sousa, E. S.: Two dimensional spreading codes for downlink in a multiuser system with multiple antennas, Proceedings of WPMC 2002, Honolulu, Hi., pages 743-747. FIG. 7 shows a group g1 of complex one-dimensional complete complementary spreading codes of length 4, comprising the vectors $f_1^1$, $f_2^1$ and a group g2 comprising the vectors $f_1^2$, $f_2^2$ for N=2. The brackets (x,y) here stand for a complex number with the actual element x and the imaginary element y.

FIG. 8 shows complex square matrices of the first group G1 of matrices, namely $C_1^1$, $C_2^1$, $C_3^1$ and $C_4^1$, and the second group G2 of matrices, namely $C_1^2$, $C_2^2$, $C_3^2$ and $C_4^2$, based on the vectors in FIG. 7. For clarification, FIG. 9 shows the matrix $C_1^1$ in written form, i.e. in complex notation.

The matrices do not however have to be square matrices. A formula for calculating rectangular matrices is proposed below. The nth matrix of the kth group is referred to as $C_n^k$, with $C_{n,i}^k$ representing the ith column of the matrix $C_n^k$. The matrix $C_n^k$ is a matrix of dimension P2×Q2.

The columns $C_{n,i}^k$ of the matrix $C_n^k$ are calculated according to $$C_{n,i}^k = f(Q)_{[(n-1)mod\,Q]+1}^k \times f(P)_{v,i}^1 \quad \text{(formula 2)},$$

where k=1,2 . . . Q, i.e. there are Q groups and n=1,2, . . . , P×Q, i.e. each group contains P×Q matrices, and $$v = \left\lfloor \frac{n-1}{Q} + 1 \right\rfloor.$$

t is a whole-number constant with 1≦t≦P.

Two different one-dimensional complete complementary spreading codes defined above according to $f_n^k=(f_{n,1}^k, f_{n,2}^k, \ldots, f_{n,L}^k)$ are included in this calculation of the code matrices. f(Q) stands for one such with N=Q and f(P) for one such with N=P. Where P=Q square matrices can be calculated with the formula 2.

The processing gain of these matrices corresponds to $P^3 \times Q^3$, according to the number of matrix elements in all the matrices of a group. The statements relating to the matrices calculated using formula 1 apply for the autocorrelation and cross-correlation characteristics.

Where P=2 and Q=4, FIG. 10 shows the eight actual rectangular code matrices $C_1^1$, $C_2^1$, $C_3^1$, $C_4^1$, $C_5^1$, $C_6^1$, $C_7^1$ and $C_8^1$ of the first group G1. Each group contains eight code matrices and the processing gain is 512.

The same formula 2 equation can also be applied to complex one-dimensional code vectors, to obtain complex code matrices. The situation where P=2 and Q=4 is considered below. FIG. 7 shows the vectors $f_1^1$, $f_2^1$, $f_1^2$ and $f_2^2$ for N=2, the FIGS. 11*a* and 11*b* show the vectors $f_1^1$, $f_2^1$, $f_3^1$ and $f_4^1$ of the first group g1, the vectors $f_1^2$, $f_2^2$, $f_3^2$ and $f_4^2$ of the second group g2, the vectors $f_1^3$, $f_2^3$, $f_3^3$ and $f_4^3$ of the third group g3, and the vectors $f_1^4$, $f_2^4$, $f_3^4$ and $f_4^4$ of the fourth group g4 for N=4. These two one-dimensional code vectors of different length for N=2 and N=4 are used to form eight complex rectangular code matrices $C_1^1$, $C_2^1$, $C_3^1$, $C_4^1$ $C_5^1$, $C_6^1$, $C_7^1$ and $C_8^1$ of the first group G1 according to the formula 2, as shown in FIGS. 12*a* and 12*b*. Both the number of matrices per group and the processing gain correspond to the actual code matrices.

Up to this point it has been shown that N groups of matrices can be derived from one-dimensional complete complementary spreading codes of length $N^2$=L or for the rectangular instance Q groups of matrices from one-dimensional complete complementary spreading codes of length Q2 and P2. It is shown below that N2 groups can be derived from one-dimensional complete complementary spreading codes of length N2 . The inventive nth matrix of the kth group is referred to as $C_n^k$, with $C_{n,i}^k$ representing the ith column of the matrix $C_n^k$. The matrix $C_n^k$ is a matrix of dimension L×L.

A matrix can be calculated according to $$c_{n,i}^k = f_{[(n-1)\text{mod}N]+1}^{[(k-1)\text{mod}N]+1} \times f_{v,i}^t, \quad \text{(formula 3)}$$

where k=1,2, . . . N2, i.e. there are N2 groups and n=1,2, . . . N2, i.e. each group contains N2 matrices and $$v = \left\lfloor \frac{n-1}{Q} + 1 \right\rfloor,$$

$$t = \left\lfloor \frac{k-1}{N} + 1 \right\rfloor.$$

In this instance the number of matrices per group and the processing gain correspond to the corresponding variables of formula 1 but the number of groups is greater by the factor N. The characteristics relating to autocorrelation and cross-correlation correspond to those in formula 1.

Figure 13A:
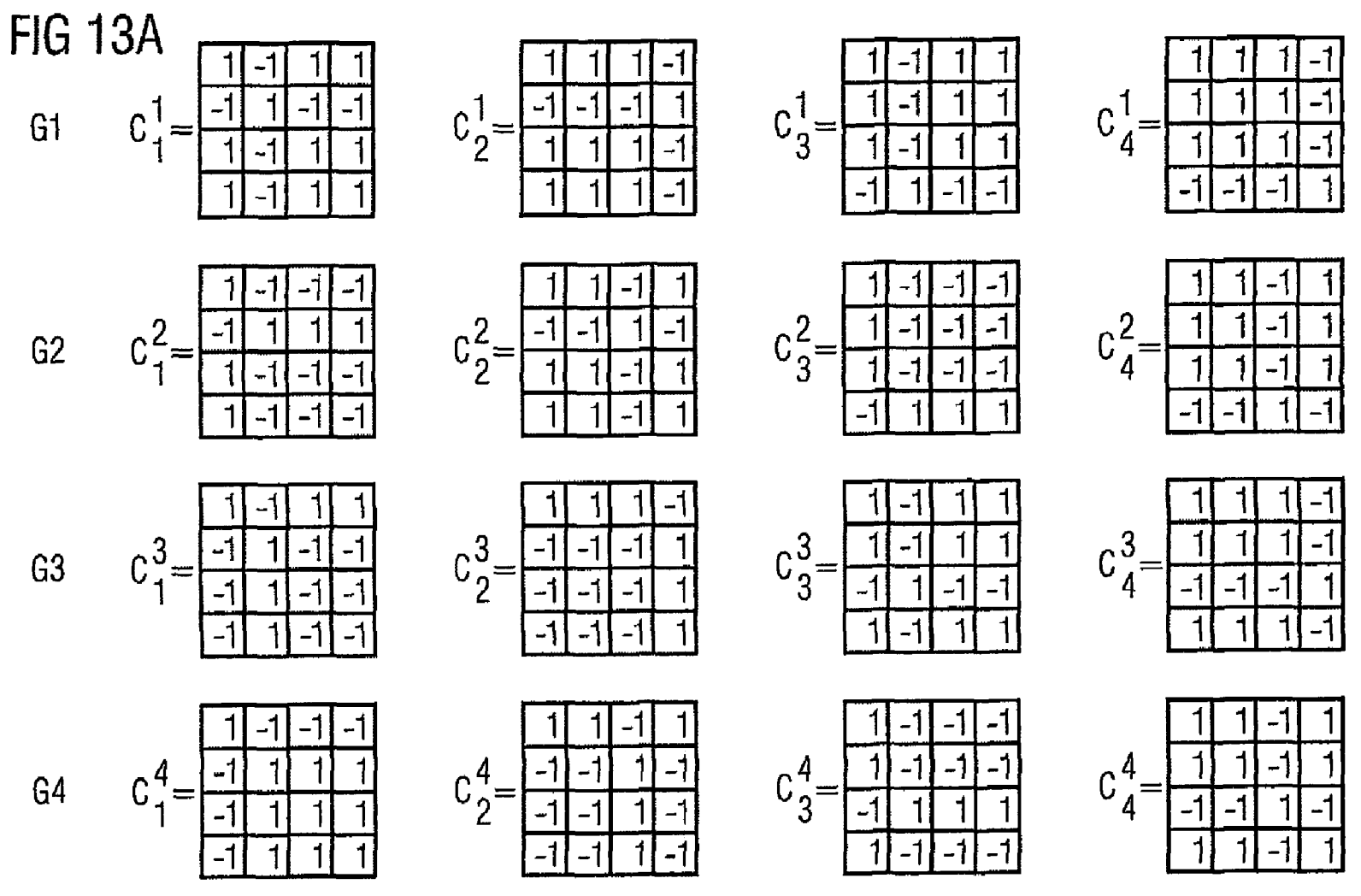

Figure shows the first group G1 with the matrices $C_1^1$, $C_2^1$, $C_3^1$, $C_4^1$, the second group G2 with the matrices $C_1^2$, $C_2^2$, $C_3^2$, $C_4^2$, the third group G3 with the matrices $C_1^3$, $C_2^3$, $C_3^3$, $C_4^3$ and the fourth group G4 with the matrices $C_1^4$, $C_2^4$, $C_3^4$, $C_4^4$ for N=2. Compared with the corresponding square actual matrices for N=2 in FIG. 3, the number of groups in FIG. 13*a* has doubled, i.e. it has been multiplied by the factor N=2. The processing gain for the matrices in FIG. 13*a* is 64.

The advantage of using the formula 3 is that the larger number of different groups means that a different group of code matrices respectively can be allocated for communication purposes to a larger number of subscriber stations, thus allowing an increase in the number of subscribers communicating simultaneously within the same radio cell.

FIG. 14 shows the four groups G1, G2, G3 and G4 of four code matrices $C_1^1$, $C_2^1$, $C_3^1$, $C_4^1$, $C_1^2$, $C_2^2$, $C_3^2$, $C_4^2$, $C_1^3$, $C_2^3$, $C_3^3$, $C_4^3$ $C_1^4$, $C_2^4$, $C_3^4$, $C_4^4$ respectively when using complex linear code vectors according to FIG. 7.

It is also possible to increase the number of groups from Q to Q×P for rectangular code matrices, using $$c_{n,i}^k = f(Q)^{[(k-1)\bmod N]+1}_{[(n-1)\bmod N]+1} \times f(P)^t_{v,i}, \qquad \text{(formula 4)}$$

where k=1,2, . . . , P×Q, i.e. there are Q×P groups and n=1,2, . . . P×Q, i.e. each group contains Q×P matrices and $$v = \left\lfloor \frac{n-1}{Q} + 1 \right\rfloor,$$

$$t = \left\lfloor \frac{k-1}{N} + 1 \right\rfloor.$$

Compared with the formula 2, the number of groups has been increased by the factor P, while the variables for the individual code matrices, the processing gain and the autocorrelation and cross-correlation characteristics are unchanged.

FIG. 15 shows the eight rectangular code matrices $C_1^8$, $C_2^8$, $C_3^8$, $C_4^8$ $C_5^8$, $C_6^8$, $C_7^8$ and $C_8^8$ of the eighth group G8 for P=2 and Q=4. The processing gain is 512. FIGS. 16*a* and 16*b* show the eight complex matrices $C_1^1$, $C_2^1$, $C_3^1$, $C_4^1$ $C_5^1$, $C_6^1$, $C_7^1$ and $C_8^1$ of the first group of code matrices for P=2 and Q=4, obtained using the formula 4 from the one-dimensional complex vectors in FIGS. 7, 11*a* and 11*b*.

Until now it has been assumed that linear complete complementary spreading codes have been used, which are such that there are N groups respectively with N vectors, each vector having the length L=N2 . Such linear complete complementary spreading codes are proposed for example in N. Suehiro, M. Hatori: "N-shift cross orthogonal sequences", IEEE Trans. Info. Theory, vol. IT-34, no. 1, January 1988, pages 143-146. The formulae described above can also be applied to linear complete complementary spreading codes, which are such that there are N groups respectively with N vectors, each vector having the length N. Such spreading codes are for example proposed in C. C. Tseng, C. L. Liu: "Complementary sets of sequences", IEEE Trans. Info. Theory, vol. IT-18, pages 644-652, 1972. These shorter linear complete complementary spreading codes also result in groups of matrices, which have the advantageous characteristics described above in respect of autocorrelation and cross-correlation, when the above equations are used.

Application of the formula 3 to the shorter linear spreading codes results in N2 groups respectively of N2 matrices $C_n^k$ of dimension N×N, while the instance described before of the longer linear spreading codes resulted in N2 groups respectively of N2 matrices $C_n^k$ of dimension N2 ×N2 . FIG. 13*b* shows the first group G1 with the matrices $C_1^1$, $C_2^1$, $C_3^1$, $C_4^1$, the second group G2 with the matrices $C_1^2$, $C_2^2$, $C_3^2$, $C_4^2$, the third group G3 with the matrices $C_1^3$, $C_2^3$, $C_3^3$, $C_4^3$ and the fourth group G4 with the matrices $C_1^4$, $C_2^4$, $C_3^4$, $C_4^4$ for N=2. The processing gain for the matrices in FIG. 13*b* is 16.

Application of the formula 4 to the shorter linear spreading codes results in Q×P groups respectively of Q×P matrices $C_n^k$ of dimension Q×P, while the instance described before of the longer linear spreading codes resulted in Q×P groups respectively of Q×P matrices $C_n^k$ of dimension Q×P2.

The described code matrices according to the formula 1, 2, 3 and 4 share the advantage that they have a high processing gain and therefore allow a high level of security in respect of receiver-side detection. Compared with the one-dimensional complete complementary code vectors, the larger number of matrix elements compared with the number of corresponding vector components means that the processing gain is increased.

A further advantage of the method compared with the use of one-dimensional complete complementary code vectors relates to the complexity of the modulation method to be used. As already described above, with one-dimensional code vectors of length L=N2, the modulation method must allow simultaneous transmission of L+1 different symbols. If a specific group of code vectors is allocated to every user for communication purposes, the maximum number of users is N. Therefore the use of one-dimensional complete complementary code vectors requires a highly complex modulation method, particularly with a large number of users. For the same processing gain as the method, compared with the use of one-dimensional complete complementary code vectors, the code matrices only need to be able to transmit N+1 different symbols at one time. This advantageously reduces the demands on the modulation method.

The smaller size of the linear spreading codes reduces system complexity further, as with shorter linear spreading codes the modulation method used only has to allow the simultaneous transmission of N+1 different symbols, while with the longer linear spreading codes, it must be possible to transmit N2 +1 different symbols simultaneously.

A group of code matrices is allocated to a subscriber station in a radio communication system for communication purposes. Every data bit to be transmitted from or to the subscriber station is transmitted on a number of units of a first radio resource. This first radio resource can for example be a frequency, as in the example in FIG. 2, or even spatial directions according to the MIMO (Multiple In Multiple Out) method. A number of transmit and receive antennae is hereby used on both the transmitter and receiver sides, as a result of which the receiver can separate the signals sent from the transmitter by the different antennae.

The units of the first radio resource can be described as planes, which are defined by two further radio resources, the second and third radio resources. However any other radio resource in addition to frequency or space can also be used as the first radio resource, according to which the planes are differentiated, e.g. a number of successive time slots.

FIG. 17 shows two frequency-time planes, which are differentiated by the first radio resource, frequency. The first plane is characterized by the radio frequency F1, the second by the radio frequency F2. The radio frequencies F1 and F2 respectively are frequency bands that can be broken down further into sub-bands. This breakdown is carried out using the third radio resource, the frequency f, so that a multicarrier CDMA method is described. The sub-bands can in particular be equidistant and orthogonal. The planes are also divided into time segments of equal length according to the second radio resource, the time t. The elementary surfaces of the frequency-time planes therefore represent a combination of a sub-band and a time segment, all having the same surface. Any other radio resources or combinations of radio resources in addition to frequency and time can be used for the second and third radio resources. An example here is the use of time-space planes.

A code matrix from the group of code matrices allocated to the subscriber station is assigned to every time-frequency plane. The number of available planes should therefore correspond to the number of matrices in the groups or at least should not be below this. Every data bit to be transmitted is spread on every frequency-time plane using the assigned matrix. To this end the lines of the matrix serve for spreading in respect of the second radio resource, i.e. the time t. The columns of the code matrices serve for spreading in respect of the third radio resource, i.e. the frequency f.

Figure 18:
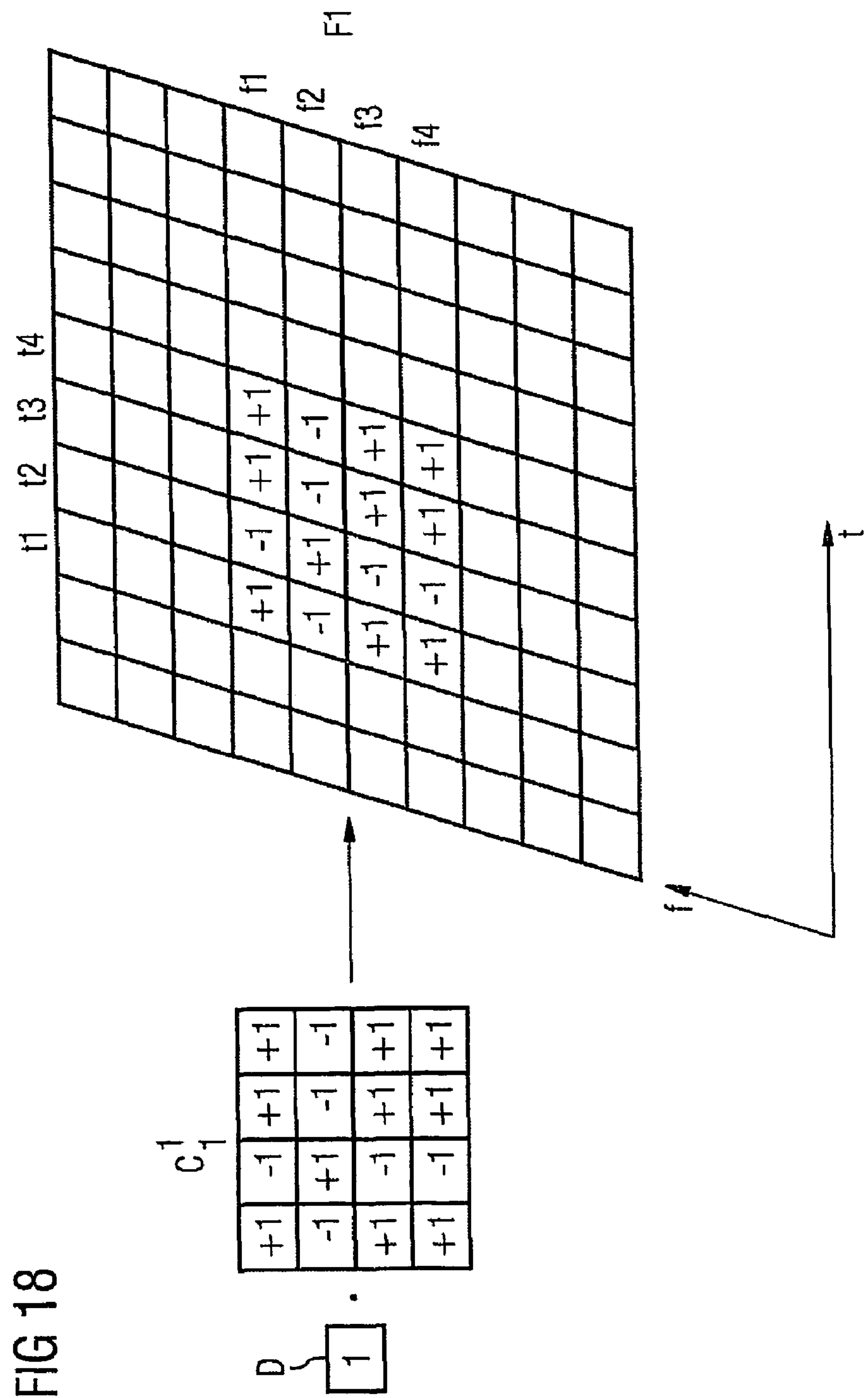
FIG. 18 shows a schematic diagram of the spreading of a data bit according to one embodiment of the inventive method.

FIG. 18 shows an example of such spreading. The data bit D to be transmitted is a one. This is multiplied by the matrix $C_1^1$ in FIG. 3, which was assigned to the plane with the radio frequency F1. This multiplication result is transmitted on the plane with the radio frequency Fl such that on a first sub-carrier f1 at a first time t1 the chip +1 is transmitted, at a second time t2 the chip −1, at a third time t3 the chip +1 and at a fourth time t4 the chip +1. Simultaneously on a second sub-carrier f2 at a first time t1 a −1 is transmitted, at a second time t2 a +1, at a third time t3 a −1 and at a fourth time t4 a −1. The same applies to a third and fourth sub-carrier f3 and f4.

Corresponding spreading of the same data bit D is carried out for the other planes using the code matrices assigned to said planes, with no code matrix being assigned to more than one plane. In the simplest instance the same or corresponding surfaces as on the first plane are used for transmission on the other planes, i.e. the same times t1, t2, t3 and t4 and the same sub-carriers f1, f2, f3 and f4. Such a case is shown in FIG. 19. In respect of the second radio resource, the time t, this means that simultaneous transmission of the chips takes place on the different planes. In respect of the third radio resource, the frequency f, this corresponds to a displacement in the frequency space by a constant amount in each instance, corresponding to the frequency difference between the different planes.

It is however also possible to transmit the chips of a data bit on non-corresponding surfaces on the different planes, as shown in FIG. 20. Here the times t1, t2, t3 and t4 and the sub-bands f1, f2, f3 and f4 are used to transmit the chips of the data bit on the plane with the radio frequency f2, while the times t2, t3, t4 and t5 and the sub-bands f3, f4, f5 and f6 are used to transmit the chips of the same data bit on the plane with the radio frequency f1. The receiver must be informed of the different positions of the surfaces on the sub-bands. A dynamic change in the relative positions of the surfaces of the chips of a data bit increases the security against interception of the data transmission.

Figure 21:
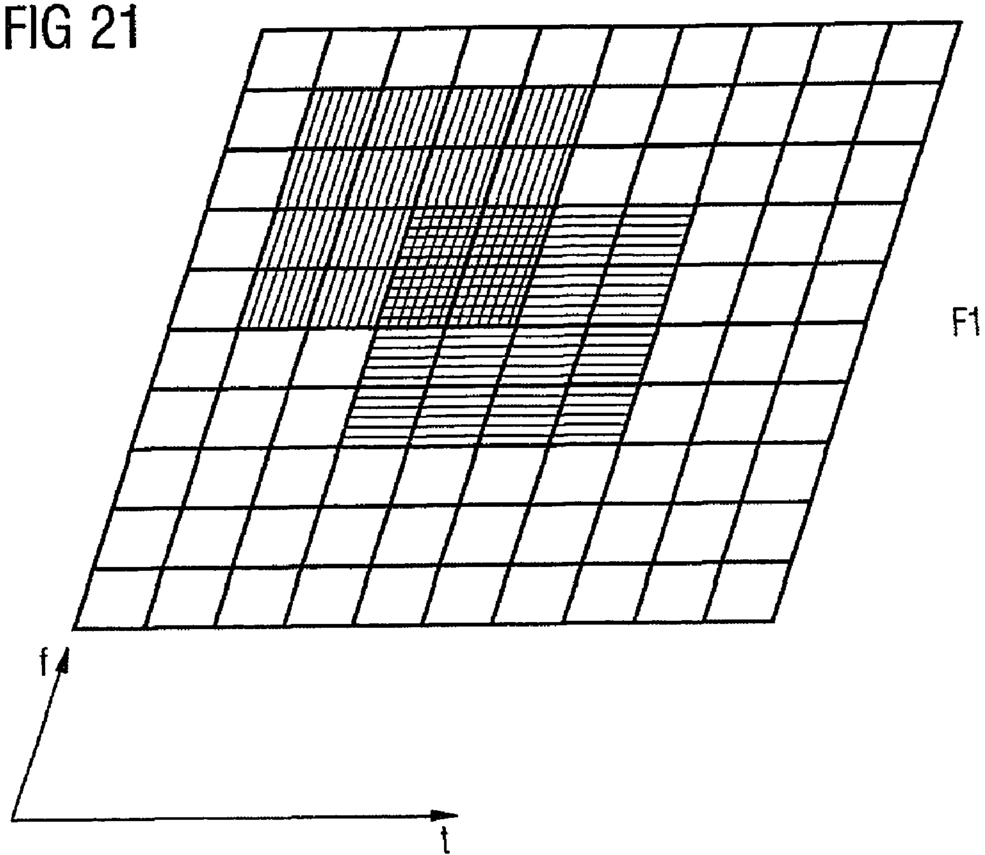
FIG. 21 shows a schematic diagram of the transmission of two successive data bits on one plane.

A subsequent data bit is spread in the same manner for every plane. FIG. 21 shows the units of the second and third radio resources used for transmission of a first data bit by a vertically shaded square. The units of the second and third radio resources used for transmission of the subsequent data bit are shown as a horizontally shaded square. These two squares can overlap, as shown in FIG. 21. Generally the second square can be displaced in any manner in the plane in relation to the first. Only vanishing displacement is impossible, as otherwise the fully overlapping bits could no longer be separated in the receiver. Displacement in just one direction is also possible, e.g. displacement solely along the third radio resource, the frequency f, so that a number of data bits can be transmitted simultaneously. If the chips of different data bits overlap in the planes, the combinations of overlapping symbols are sent on the radio resources corresponding to the overlapping elementary surfaces. According to the statements above relating to the use of the same or corresponding units of the second and third radio resources on the different planes, the overlaps in the different planes may be the same or different when subsequent data bits are transmitted.

Corresponding statements apply to all the code matrices described above as well as the square actual code matrices.

The overlapping as described within the planes allows the spread data bits to be distributed to the planes for transmission in an effective and economical manner in respect of resources, as a result of which available radio resources can be significantly better utilized compared with conventional CDMA methods. Significant surface overlapping corresponds to a high transmission rate. It is therefore possible to adjust the transmission rate as required, by adjusting the two-dimensional displacement of the surfaces used for transmission in respect of each other. It is hereby advantageous that the processing gain is not a function of the transmission rate, so the processing gain does not drop, even at the maximum transmission rate. Compared with the use of one-dimensional complete complementary code vectors, the maximum transmission rate is significantly higher with the use of code matrices. This is due to the fact that when code matrices are used, the surfaces of successive data bits can be displaced in two dimensions, while with the code vectors displacement is only possible in one direction. With frequency-time planes for example the number of simultaneously transmitted chips is only limited by the number of sub-bands. If the number of sub-bands for example allows four chip surfaces overlapping in the same time interval to be transmitted with just one displacement in the frequency direction, the data rate thereby achieved is four times higher than when using code vectors.

As described in the one-dimensional case, the receiver carries out a correlation between the chips of the spread data bits received on the different planes and the code matrix used on the respective plane. The correlation results of the different planes are also added together. The autocorrelation characteristics of the code matrices therefore allow the transmitted data bits to be detected separately from each other.

Other groups of code matrices can be allocated to other subscriber stations. Code matrices are allocated to the planes for all subscriber stations according to a standard pattern, so that the matrices $C_1^1$ are assigned to the first plane for example, the matrices $C_2^1$ to the second plane, etc., with i representing the different groups or subscriber stations. The cross-correlation characteristics of the code matrices mean that the surfaces of the planes of different subscriber stations used for transmission can overlap partially or completely. If there is an overlap, the transmitter transmits the combination or sum of the individual chips. A radio access arrangement acting as the receiver can therefore separate data bits from different users, which were sent using the same or overlapping chip surfaces in the planes. Similarly a subscriber station acting as the receiver can differentiate data bits, which were sent by a radio access arrangement using the same or overlapping surfaces of the planes to other subscriber stations, from the data bits intended for it.

Until now it has been assumed that the planes comprise a number of successive units of a second radio resource in combination with a number of successive units of the third radio resource. The method can however also be applied, even if the planes have holes, i.e. many elementary surfaces of the planes are not available for data transmission. In this instance the squares of FIG. 19 can change their shape, whilst retaining the same overall surface, but the surfaces must then no longer be simply contiguous.

Figure 22:
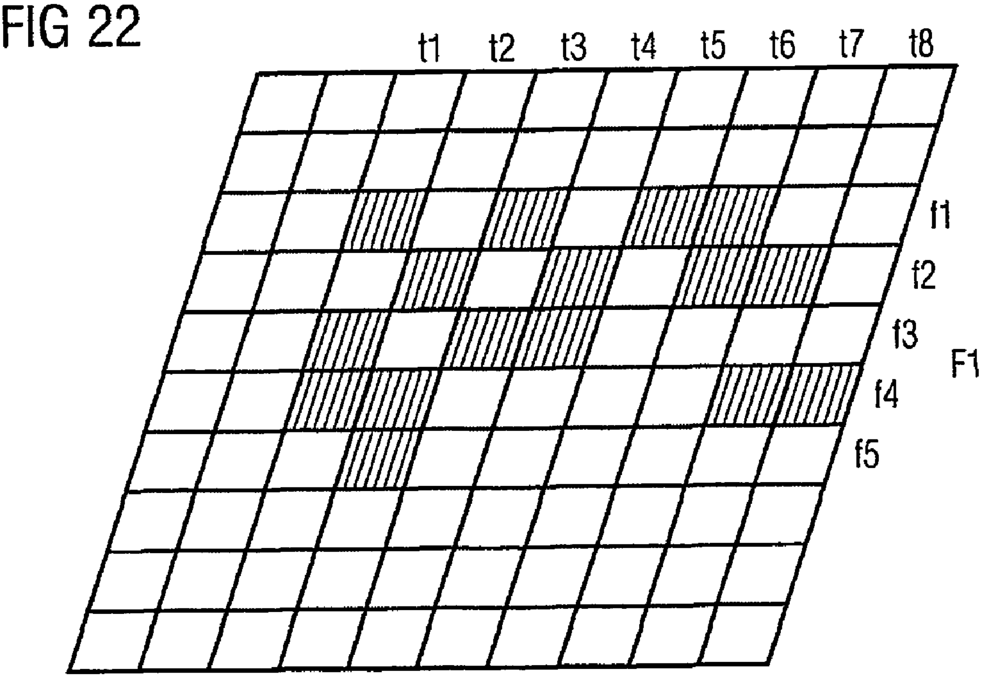
FIG. 22 shows a specific spread of a data bit.

The chip surfaces shown in FIGS. 18 to 21 may also be non-contiguous surfaces, as shown by way of an example in FIG. 22. In this case the chips are not only transmitted at successive times in successive sub-carriers. The summated surface of the elementary surfaces of the plane, shown shaded in FIG. 22, corresponds to a square with side lengths of four elementary surfaces of the plane when a 4×4 code matrix is used.

If a specific group of code matrices is allocated to every subscriber station within a radio cell of a radio communication system for communication purposes, the subscriber stations can send and receive data bits on any surfaces in the planes, irrespective of the second and third radio resources on which the other subscriber stations communicate. The cross-correlation characteristics mean that the signals from or for the subscriber stations can be differentiated with different groups of code matrices. However this procedure has the disadvantage that the maximum number of subscriber stations within the radio cell is limited in an upward direction by the number of groups. It can therefore be advantageous to allocate the same group of code matrices to a large number of subscriber stations for communication purposes.

However if a number of subscriber stations use the same code matrix on overlapping surfaces of a plane, it is no longer possible to separate the signals from these subscriber stations. It is therefore advantageous also to allocate second and/or third radio resources to the subscriber stations with the same group of code matrices. Such an allocation is shown by way of an example in FIGS. 23*a* and 23*b*.

Figure 23A:
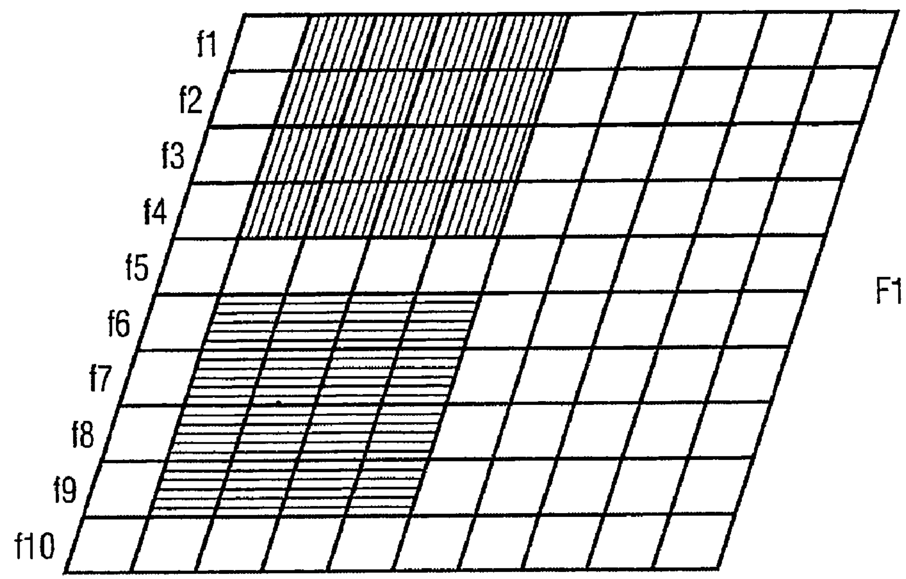
FIG. 23*a* shows a first example of communication by two subscriber stations on one plane with the same code matrix.

In FIG. 23*a* the sub-bands f1, f2, f3, f4 and f5 have been allocated to a first subscriber station (the chips of the first subscriber station are shown by vertical shading), while the frequency bands f6, f7, f8, f9 and f10 have been allocated to a second subscriber station (the chips of the second subscriber station are shown by horizontal shading). The two subscriber stations can therefore communicate simultaneously using the same code matrix, as shown in FIG. 23*a*.

Figure 23B:
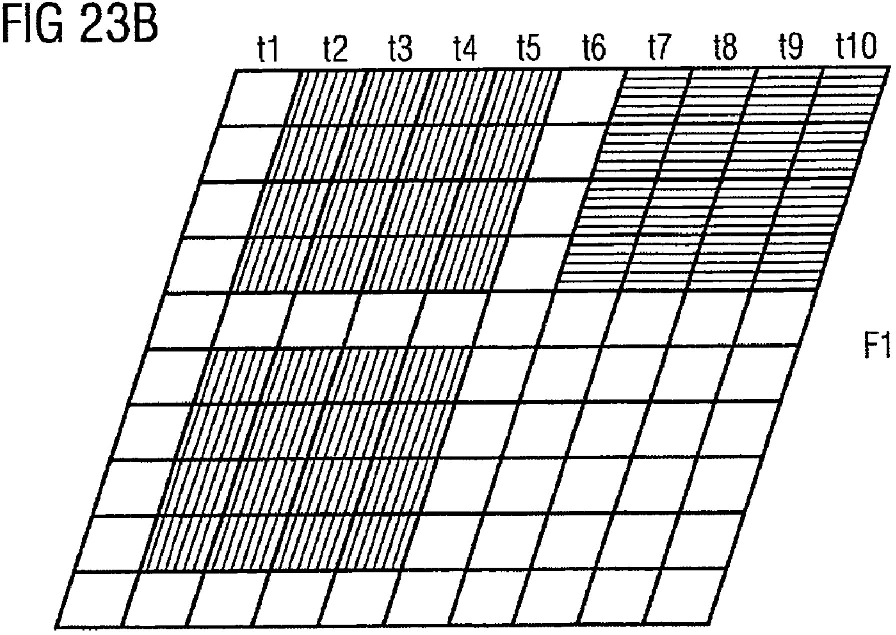
FIG. 23*b* shows a second example of communication by two subscriber stations on one plane with the same code matrix.

FIG. 23*b* shows the situation where the times t1, t2, t3, t4 and t5 have been allocated to the first subscriber station, while the times t6, t7, t8, t9 and t10 have been allocated to the second subscriber station. The two subscriber stations can therefore communicate on the same sub-bands using the same code matrix for spreading.

It is generally possible to allocate any combination of second and third radio resources to any number of subscriber stations using the same group of code matrices for communication purposes, as long as the chips of these subscriber stations do not overlap. Dynamic allocation of the second and/or third radio resources (chip hopping) can be advantageous in respect of security against interception.

There is generally synchronization between data transmissions to different subscriber stations for the downlink transmission of data. In this instance the autocorrelation and cross-correlation characteristics of the code matrices allow complete separation of the data from different subscriber stations to be achieved. However there is frequently no such almost ideal synchronization for the uplink transmission of data. A test of relevant variables for asynchronous data transmission in a multicarrier CDMA system was proposed in B. M. Popovic: Spreading Sequences for Multicarrier CDMA Systems, IEEE Trans. on Communications, vol. 47, no. 6, June 1999, pages 918-926. With regard to the relevant variables crest factor, dynamic range of complex signal envelope and mutual interference, it can be seen that the code matrices essentially retain their orthogonality characteristics even during asynchronous data transmission.

The advantage of using shorter linear spreading codes, which can for example result in the matrices in FIG. 13*b*, compared with using longer ones, which can for example result in the matrices in FIG. 13*a*, is that for the same number of groups and the same number of matrices per group the size of the matrices is smaller when the shorter linear spreading codes are used. This means that a larger number of matrices can be positioned on a plane. Therefore radio resources can be allocated simultaneously to a larger number of subscriber stations in the case of defined radio resources. This is particularly advantageous in the case of very limited planes, for example when narrow frequency bands are available.

Figure 24:
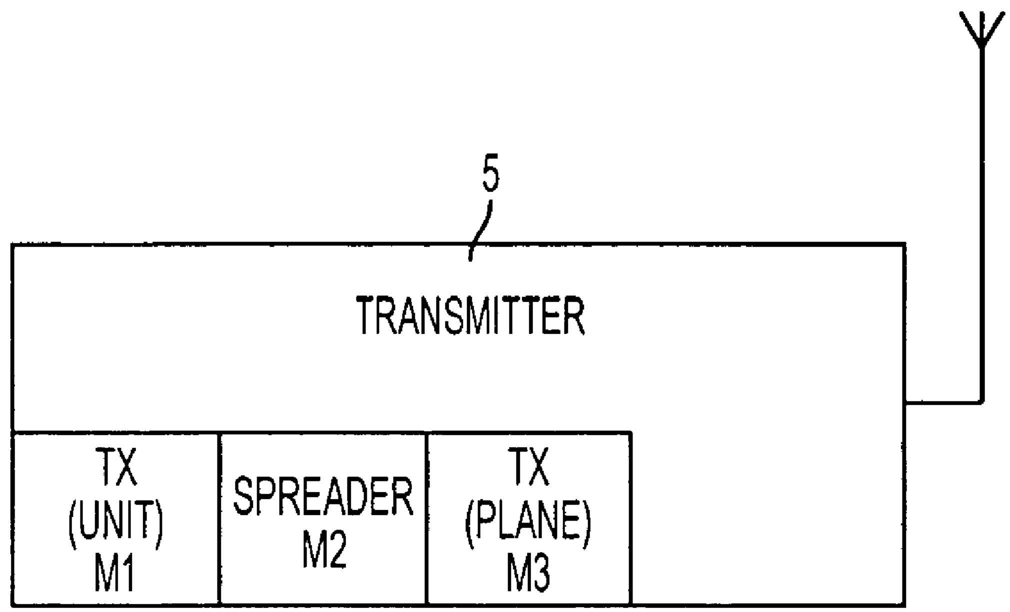
FIG. 24 shows one embodiment of an inventive transmitter.

A transmitter S is shown in FIG. 24. It comprises unit Ml for transmitting each data bit on a number of units of the first radio resource and unit M2 for the spreading of the data bits for every plane, as well as unit M3 for transmitting a data bit on a number of planes according to the spread. The transmitter can also have means for defining code matrices according to the formulae 1 to 4 from one-dimensional complete complementary spreading codes.

Figure 25:
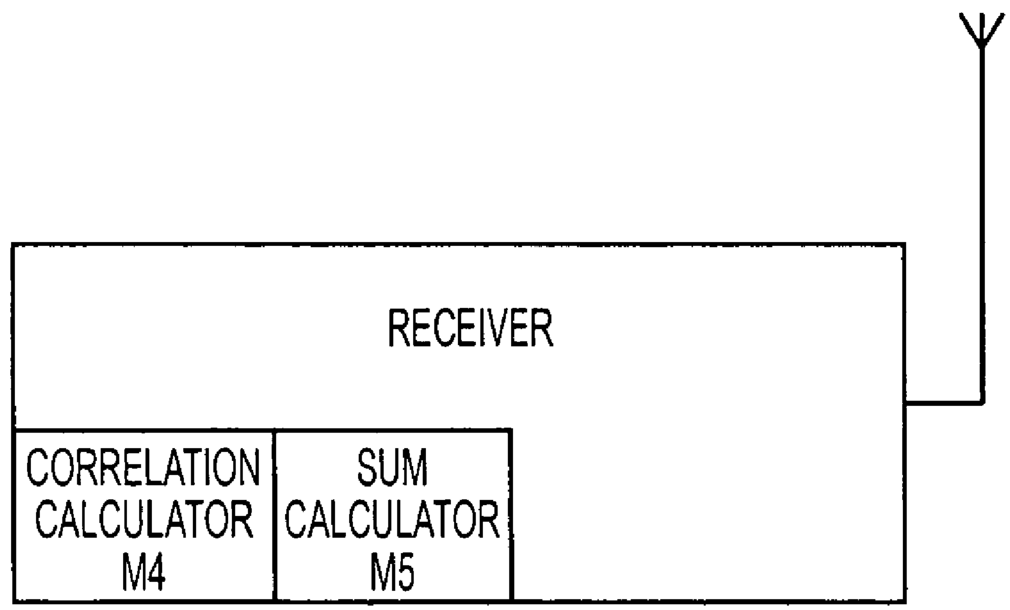
FIG. 25 shows one embodiment of an inventive receiver.

FIG. 25 shows an receiver E with unit M4 for calculating correlations between received chips and the relevant matrices according to the transmitter-side method and with unit M5 for calculating sums of correlation results, calculated for the individual planes.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting data bits between at least one subscriber station and a transmitter in a radio communication system, comprising:

transmitting each data bit from a transmitter on at least two different units of a first radio resource; and spreading the data bits at the transmitter for every unit of the first radio resource, such that every data bit is multiplied by a respective code matrix from a group of code matrices, the group being the same for the units of the first radio resource, wherein the lines of the code matrices respectively represent a spreading code relating to a second radio resource and the columns of the code matrices respectively represent a spreading code relating to a third radio resource, there are at least first and second groups of code matrices used for spreading, each group containing the same number of code matrices, for every group of code matrices the sum of the autocorrelations of all code matrices is not equal to zero only in the case of vanishing two-dimensional displacement, within the first and second groups, each matrix is numbered, each matrix in the first group has a matrix in the second group to which it is paired, the paired matrices corresponding based on matrix numbering, for each pair of groups, the sum of cross-correlations of all matrices that correspond due to their numbering is equal to zero for vanishing and non-vanishing two-dimensional displacement, and every data bit is transmitted on the at least two different units of the first radio resource, in combination with a plurality of units of the second radio resource defined by the spreading and with a plurality of units of the third radio resource defined by the spreading.

2. The method according to claim 1, wherein the first, second, and third radio resources are each different and are each independently selected from the group consisting of frequency, time and space.

3. The method according to claim 1, wherein the code matrices used for spreading are derived using a formula from one or more sets of groups of vectors, such that:

there are at least first and second groups of vectors containing the same number of vectors, for every group of vectors the sum of the autocorrelations of all vectors is not equal to zero only in the case of vanishing one-dimensional displacement, within the first and second groups, each vector is numbered, each vector in the first group has a vector in the second group to which it is paired, the paired vectors corresponding based on vector numbering, and for each pair of groups the sum of cross-correlations of all vectors that correspond due to their numbering is equal to zero for vanishing and non-vanishing displacement within each set of groups of vectors.

4. The method according to claim 1, wherein a mutually different group of code matrices is allocated to at least two subscriber stations of the radio communication system.

5. The method according to claim 4, wherein a group of code matrices and second and/or third radio resources is allocated to at least one subscriber station.

6. The method according to claim 1, wherein every data bit for every unit of the first radio resource is transmitted on the same or mutually corresponding units, of the second and third radio resources.

7. The method according to claim 1, wherein the units of the second radio resource used in combination with the units of the third radio resource for transmission of at least two successive data bits for at least one unit of the first radio resource partially overlap.

8. The method according to claim 1, wherein the units of the second radio resource used in combination with the units of the third radio resource for transmission of at least two successive data bits for at least one unit of the first radio resource are defined according to a pattern on the transmitter side.

9. The method according to claim 1, wherein correlations between the received spread data bits and a code matrix of the group used on the transmitter side and summation of correlation results over the different units of the first radio resource are carried out on the receiver side for the at least two different units of the first radio resource.

10. The method according to claim 3, wherein a mutually different group of code matrices is allocated to at least two subscriber stations of the radio communication system.

11. The method according to claim 10, wherein a group of code matrices and second and/or third radio resources is allocated to at least one subscriber station.

12. The method according to claim 11, wherein every data bit for every unit of the first radio resource is transmitted on the same or mutually corresponding units, of the second and third radio resources.

13. The method according to claim 12, wherein the units of the second radio resource used in combination with the units of the third radio resource for transmission of at least two successive data bits for at least one unit of the first radio resource partially overlap.

14. The method according to claim 13, wherein the units of the second radio resource used in combination with the units of the third radio resource for transmission of at least two successive data bits for at least one unit of the first radio resource are defined according to a pattern on the transmitter side.

15. The method according to claim 14, wherein correlations between the received spread data bits and a code matrix of the group used on the transmitter side and summation of correlation results over the different units of the first radio resource are carried out on the receiver side for the at least two different units of the first radio resource.

16. A transmit device for transmitting data bits to a receiver in a radio communication system, comprising:

a transmit unit to transmit each data bit on at least two different units of a first radio resource ; and means for spreading the data bits at the transmitter for every unit of the first radio resource, such that every data bit is multiplied by a respective code matrix from a group of code matrices, the group being the same for the units of the first radio resource, wherein the lines of the code matrices respectively represent a spreading code relating to a second radio resource and the columns of the code matrices respectively represent a spreading code relating to a third radio resource, there are at least first and second groups of code matrices used for spreading, each group containing the same number of code matrices, for every group of code matrices the sum of the autocorrelations of all code matrices is not equal to zero only in the case of vanishing two-dimensional displacement, within the first and second groups, each matrix is numbered, each matrix in the first group has a matrix in the second group to which it is paired, the paired matrices corresponding based on matrix numbering, and for each pair of groups, the sum of cross-correlations of all matrices that correspond due to their numbering is equal to zero for vanishing and non-vanishing two-dimensional displacement, the transmit device further comprises means for transmitting every data bit on the at least two different units of the first radio resource in combination with a plurality of units of the second radio resource predefined by the spreading and a plurality of units of the third radio resource defined by the spreading.

17. A receive device for processing data bits transmitted according to the method according to claim 1, comprising:

means for calculating correlations respectively for the at least two different units of the first radio resource between the received spread data bits and one of the codematrices used on the transmitter side; and means for calculating sums of correlation results over the different units of the first radio resource.

* * * * *